United States Patent [19]

Haj-Ali-Ahmadi et al.

[11] Patent Number: 5,363,310
[45] Date of Patent: Nov. 8, 1994

[54] SYSTEM AND METHOD FOR PARTIAL ORDER FILLING

[75] Inventors: Javad Haj-Ali-Ahmadi; Edward C. Hume, III, both of Austin, Tex.

[73] Assignee: International Business Machines Corporation, Armonk, N.Y.

[21] Appl. No.: 865,551

[22] Filed: Apr. 9, 1992

[51] Int. Cl.⁵ .............................................. G06F 15/24
[52] U.S. Cl. .................................... 364/478; 364/403; 414/273; 414/902
[58] Field of Search ............... 364/478, 468, 401, 402, 364/403; 414/273, 274, 902; 53/52, 495, 154

[56] References Cited

U.S. PATENT DOCUMENTS

| | | | |
|---|---|---|---|
| Re. 33,416 | 10/1990 | Konishi et al. | 364/478 |
| 4,588,348 | 5/1986 | Beni et al. | 414/730 |
| 4,588,349 | 5/1986 | Reuter | 414/786 |
| 4,692,876 | 9/1987 | Tenma et al. | 364/478 X |
| 4,835,702 | 5/1989 | Tanaka et al. | 364/478 |
| 4,988,256 | 6/1991 | Smith et al. | 414/416 |
| 5,029,095 | 7/1991 | Kenik et al. | 364/478 |
| 5,175,692 | 12/1992 | Mazouz et al. | 364/478 |
| 5,222,855 | 6/1993 | Bernard, II et al. | 364/478 X |

OTHER PUBLICATIONS

IBM TDB "Database Structure", vol. 30, No. 6, Nov. 1987, pp. 191–197.
IBM TDB "Dynamic Database", vol. 30, No. 5, Oct. 1987, pp. 125–130.

*Primary Examiner*—Joseph Ruggiero
*Attorney, Agent, or Firm*—Mark E. McBurney

[57] ABSTRACT

A method and apparatus are provided for placing a plurality of Stock Keeping Units (SKUs), e.g., brands in transport units wherein quantities of SKUs, not equal to standard SKU packages, e.g. cases, can be ordered. A material handling system, including a work area, robot, conveyors, and the like, is used in conjunction with a computer implemented planning method. The planning method determines the sequence for filling transport units by initially assigning transport units to the work area. Only one transport unit per order is assigned to the work area at a single time. The SKUs are then ranked depending on their difficulty in placement. If a partial package is required, it is considered more difficult that full packages and placed before the required full packages of that SKU. The planning method completes the oldest transport unit in the work area and attempts to place the most difficult SKUs first.

27 Claims, 12 Drawing Sheets

SYSTEM AND METHOD FOR PARTIAL ORDER FILLING

BACKGROUND OF THE INVENTION

1. Field of the Invention

The present invention relates generally to a system and method for automatically filling multiple orders of different quantities and types of items. More specifically, a system is provided wherein the quantities of any Stock Keeping Unit (SKU) for an order may be less than the standard package quantity for that particular SKU such that redistribution of SKU's into multiple transport units is required, A planning method is implemented for arranging orders into a plurality of transport units containing mixed SKU types, and sequencing the processing of SKU packages and transport units so that the orders are placed by a robotic workcell with a fixed quantity of transport unit fill positions.

2. Description of Related Art

Problems associated with automatically placing a plurality of different SKUs, i.e., brands of items, in a single storage unit are well known in the art. The problem becomes more difficult to solve when the types and quantities of SKUs to be placed in the storage units vary between orders. That is, a first order may require different quantities of several different SKUs and a subsequent order may call for different quantities of the same SKUs, or different quantities of completely different SKUs. Additionally, it can be seen that a problem exists when an order calls for a specific quantity of SKU that is less than the quantity in which the SKU is normally supplied. For example, an order may call for two units of a particular SKU (brand A) and four units of a second SKU (brand B), but brand A is supplied in cases of twelve units. Thus, ten additional units of brand A need to be placed before continuing on to brand B. In order to maximize use of a placing robot, the robot should complete placement of brand A prior to placing any units of brand B.

U.S. Pat. No. 4,588,349 discusses a method of automatically filling a kit with required parts. The parts are held in a container and stored in trays which are placed at a transfer location. A robot removes the selected container and empties it into a kit box. U.S. Pat. No. 5,029,095 describes a system that assembles multiple components wherein the components are placed in one of a plurality of bins and a display indicates a complete kit of parts to be subsequently assembled. U.S. Pat. No. 4,988,256 discusses an apparatus and method of compiling parts into individual kits. An apparatus wherein parts are singulated onto multiple feeders through a gate such that the required parts are transported to a workstation. IBM TDB "Dynamic Database" discusses a database used to manage the data flow through an automatic packaging and palletizing system. A packaging line is divided into zones with an associated computer for each zone. A kitting database is transferred from each computer to the subsequent computer as the items being packaged moves between zones. IBM TDB "Database Structure" describes an automatic parts inventory system. Inventory is stored on pallets that are located in aisles. Information is stored for the pallets based on data indexes in fields in the database. These fields include information such as the types of parts on the pallet, vendor that supplied the parts, date the parts were received, location of the pallet, oldest and newest location of a particular part, and the like.

It can be seen that conventional techniques do not provide any near optimal techniques for placing partial orders by ensuring that the most difficultly placed SKU (brand) is put in the oldest transport units before continuing to place subsequently desired brands.

SUMMARY OF THE INVENTION

In contrast to the prior art, the present invention provides a method and apparatus for planning and controlling the placement of particular SKUs (brands of an item) such that orders for less than the SKU package quantity can be placed without the need to impose ordering requirements, i.e. require that orders for the SKU be in the quantity in which it is provided. A computer implemented planning method is used that allows orders for the most difficultly placed SKU to be put in transport units before filling orders for other types of SKUs. In accordance with the present invention, requirements for less than the supplied quantity of a first type of SKU are combined such that all of the units of the first SKU are placed and orders for partial packages can be filled.

The SKU packages are sorted depending upon their relative difficulty in placing them in transport units. A material handling system, including a work area, robot, conveyors, supply means, transport units and the like, assigns a transport unit corresponding to an order requiring the most difficultly placed SKU to the work area.

Broadly, the planning and control method determines the aggregate number of SKU packages, e.g. product cases, needed for the orders, expressed as the number of full packages and the number of SKUs in a package for partial packages. The input sequence of SKU packages is determined wherein packages having the greatest number of different orders corresponding thereto (most difficult to place) are required to be the first ones used of that SKU in the input sequence. The number of transport units per order is computed and the sequence for filling the transport units is then determined. Different transport units corresponding to different orders to be filled are output from the system in a sequence that economizes the number of transport unit filling positions concurrently engaged in the work area.

The planning method of the present invention determines the sequence for filling transport units by initially assigning transport units to the work area and giving it a sequence number. The sequence number is increased for each additional new unit assigned to the work area, such that lower numbers indicate older transport units. Only one transport unit per order is assigned to the work area at a single time, thus providing more possibilities for each work area position that can be used by the planning method. The SKUs are then ranked depending on their difficulty in placement. If a partial SKU package is required, it is placed before any other full packages of that SKU. The planning method considers a partial package as a normal package until the partial package is placed, then a full package is considered normal. The transport units may contained unfilled positions, i.e. holes, since the order and transport unit capacity do not always match. Finally, a transport unit is completed when it is full, it is the last unit of an order, or when the planning method assigns holes to the unit.

The planning method completes the oldest transport unit in the work area and attempts to place the most difficult SKUs first. The difficulty in placing a SKU is determined by dividing the number of orders for an SKU by the number of packages of that SKU ordered. The higher the quotient, the more transport units are concurrently needed to redistribute an SKU package. When a SKU is examined for placement, the planning method determines whether the next package for that SKU can be placed: (1) entirely in the oldest transport unit; (2) in the oldest unit in combination with other transport units currently in the work area; or (3) be placed in the oldest unit in combination with existing transport units in the work area and new units assigned to the work area in order to complete this order. When the SKU is placed, the transport units are tested and, if complete, removed from the work area. In this manner, all orders for a particular SKU are combined and this combined requirement is compared with the items in the SKU package such that placement of the entire contents of the package is achieved.

In accordance with the previous summary, objects features and advantages of the present invention will become apparent to one skilled in the art from the subsequent description and the appended claims taken in conjunction with the accompanying drawings.

DETAILED DESCRIPTION OF THE PREFERRED EMBODIMENTS

Figure 1:
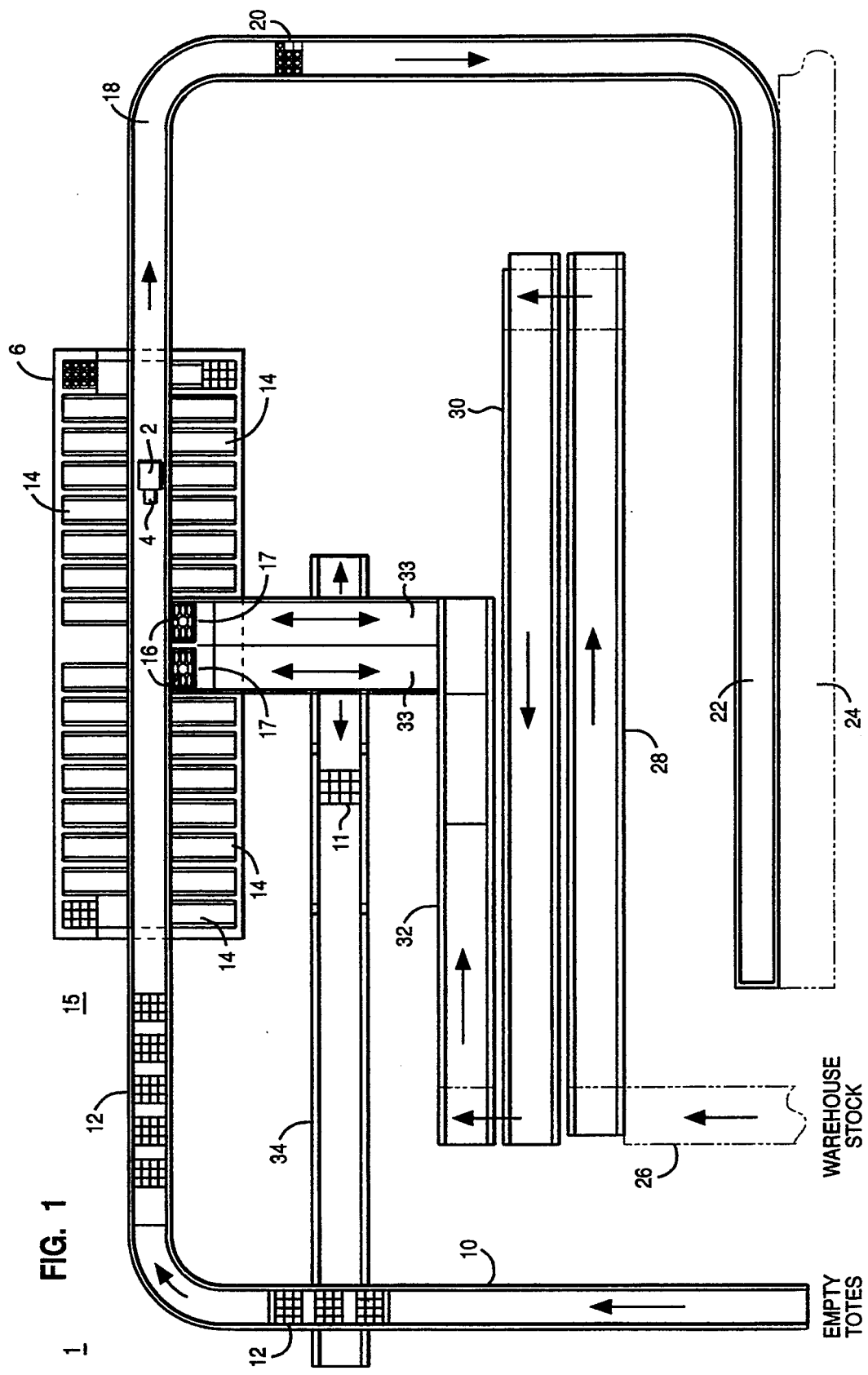
FIG. 1 is a plan view of a material handling system in accordance with the present invention.

Referring to FIG. 1, the hardware robotic conveyor and picking system 1 of the present invention is shown and will now be described. It should be noted that the planning and control method of the present invention was developed for use in a bottle ordering and filling application wherein a plurality of different brands of beverages are placed, according to specific orders, in transport units and provided to customers. Warehouse stock consisting of different supply means, i.e. packages, or product cases of different stock keeping units (brands) are placed on an input conveyor 26 and then transported via a series of warehouse stock accumulating conveyor buffers 28, 30 and 32. Dual input conveyors 33 are then used such that two cases can be constantly going into and out of work area 15. That is, one case can be entering work area 15 while another is exiting and being replaced by a subsequent case. Cases 16 are shown at unloading point 17 of the workcell 15 and are in position to be unloaded by a robot and placed in totes 12 within filling positions 14 of workcell 15. It should be noted that totes 12 are used to exemplify a type of transport unit used in the preferred embodiment of the present invention. Of course other types of transport units are contemplated by the present invention, such as partitioned areas on a conveyor, or the like. It will be understood by those skilled in the art, that a robot, such as is commercially available by Automaker, can be utilized by the present invention. Robot 2 will have the ability to access each of the filling positions 14 of workcell 15 and to move specific items of warehouse stock from cases 16 to totes 12 in fill positions 14 by means of a gripper 4, such as an end of arm tool, or the like. The robot 2 may be suspended by a gantry 6 above the work area 15 and movable therealong between unloading points 17 and fill positions 14. The robot 2 and gripper 4 positions may be controllable by a plurality of electric servo motors and appropriate control hardware and software (not shown). It will further be noted that the gripper 4 can be made to be interchangeable such that warehouse stock units other than bottles can be picked and placed. That is, the present invention is not limited to the placement of bottles in totes, but is applicable and encompasses any situation wherein a plurality of different types of warehouse stock units are to be repackaged in varying quantities to fill customers orders.

Empty totes 12 enter workcell 15 from conveyor 10 and are placed in fill positions 14 by a series of gates or the like which direct totes 12 to the proper filling position 14. In a preferred embodiment, 28 tote filling positions 14 were provided in work area 15. Of course, the number of fill positions 14 will vary depending on the type of material handling application being implemented. Once in fill position 14, the robot places the warehouse stock units, e.g. bottles into the awaiting totes 12 and empty warehouse stock containers 11, such as cases are then transported away from workcell 15 and diverted onto conveyor 34 which directs the empty cases 11 away for reuse, recycling, or the like. Once the bottles have been placed in totes 12, in accordance with the planning method of the present invention, the completed totes 20 exit workcell 15 along conveyor 18 and are transported to accumulating conveyor 22 and subsequently to customer output conveyor 24 wherein the completed totes are distributed to the customer, according to each customer order. It should be noted that after placement of the bottles in totes 12, a packing list is placed in each tote to identify the tote with a specific customer order. Thus, it can be seen that the robot 2 and conveyors work in concert to assemble the bottles into the transport units 12.

Figure 2:
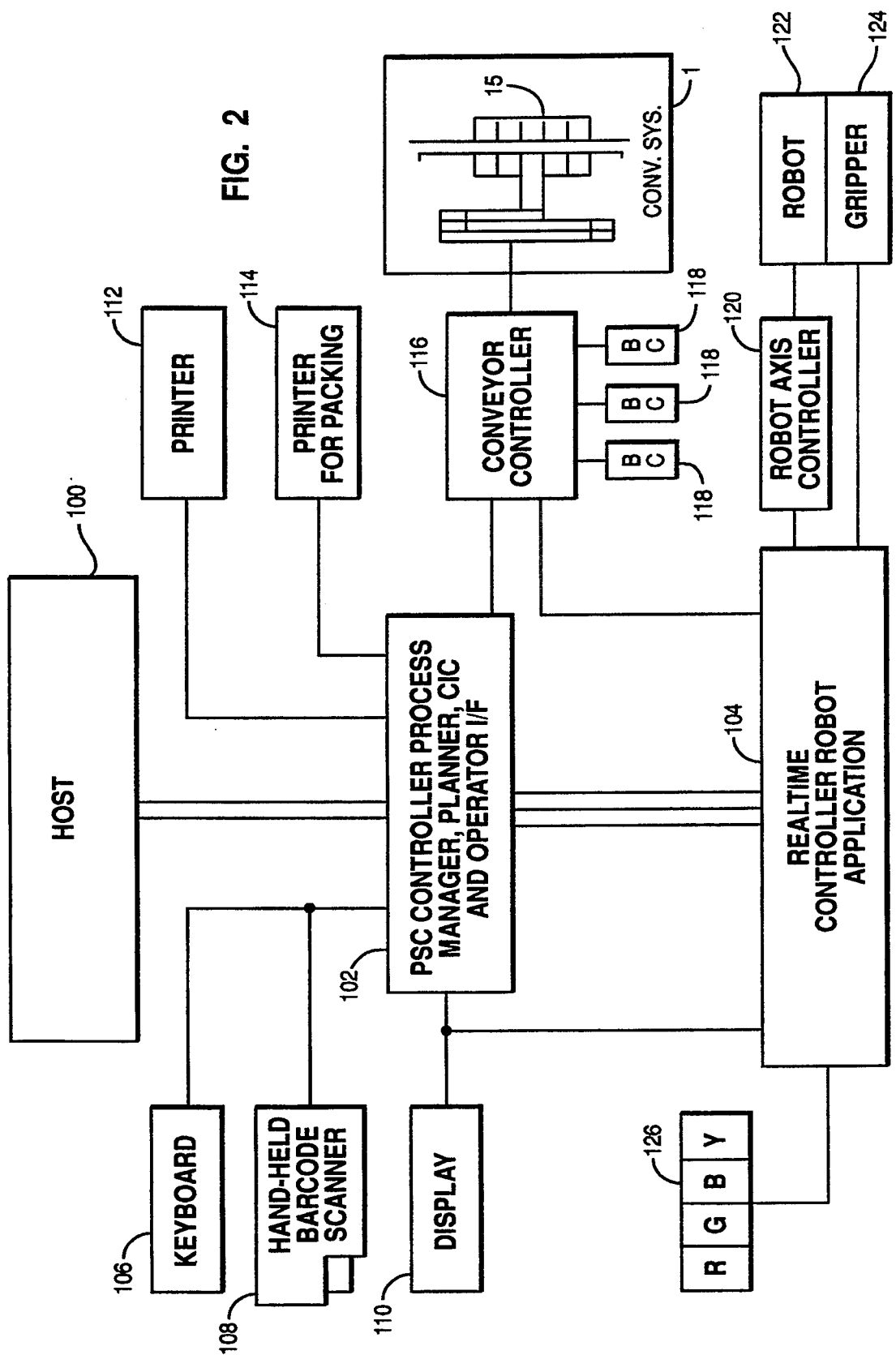
FIG. 2 is a block diagram of the hardware control for the material handling system of FIG. 1.

Referring to FIG. 2, the hardware control system of the robotic system of FIG. 1, generally referred to by reference numeral 1 is shown. A host computer system 100, such as an AS/400 midrange computer, manufactured and sold by the IBM Corporation, or the like is interconnected to a picking system controller 102, which is a typical personal computer, such as the IBM PS/2 computer. PSC 102 is then interconnected with several peripheral input/output devices such as keyboard 106, printer 112, as well as a packing list printer 114 which is used to provide the packing slip for each completed tote as it leaves workcell 15. Additionally, a display 110 and hand held bar code scanner 108 are interconnected with controller 102. Robot controller 104 is also interconnected with PSC controller 102. It can be seen that keyboard 106, printer 112, and display 110 will allow an operator to interface with the PSC controller 102. The hand held bar code scanner 108 also provides input from the operator to the PSC controller 102. The operator reads the bar code on each warehouse stock case that enters the stock accumulating conveyor 26 such that the control system can keep track of particular brands being input.

Conveyor controller 116 is also in communication with controller 102 and further controls the conveying system shown in FIG. 1. Additional bar code scanners 118 input data to conveyor controller 116. The bar code scanners 118 are placed along the conveyors shown in FIG. 1. More particularly, one scanner is placed along the input conveyors 28, 30, or 32, with the remaining two bar code scanners 118 placed on each end of workcell 15 such that an empty tote 12 can be associated with a filling position 14, and the order in which completed totes leave the workcell 15 can be determined, i.e. the totes are tracked in the work cell 15 with the first totes entering the work area 15 being considered to be the oldest. A robot axis controller 120 is also provided and communicates with the robot controller 104. Robot axis controller 120 controls the robot, schematically represented by block 122 in FIG. 2 as it moves between case unload stations 17 and filling positions 14. The robot gripper 124 is controlled directly by the robot controller 104 such that bottles, or other items, can be removed from warehouse stock cases 16 and placed into awaiting empty totes 12 within workcell 15. Indicating lights 126 are used by the operator for robot error handling. For example, a blue flashing light indicates that the line is down and in need of immediate attention, whereas a low parts intervention, such as an empty stock input conveyor or lack of empty totes, is signal by flashing yellow lights. Red and green lights may indicate the status of the robot i.e. whether it is off or on.

Figure 3:
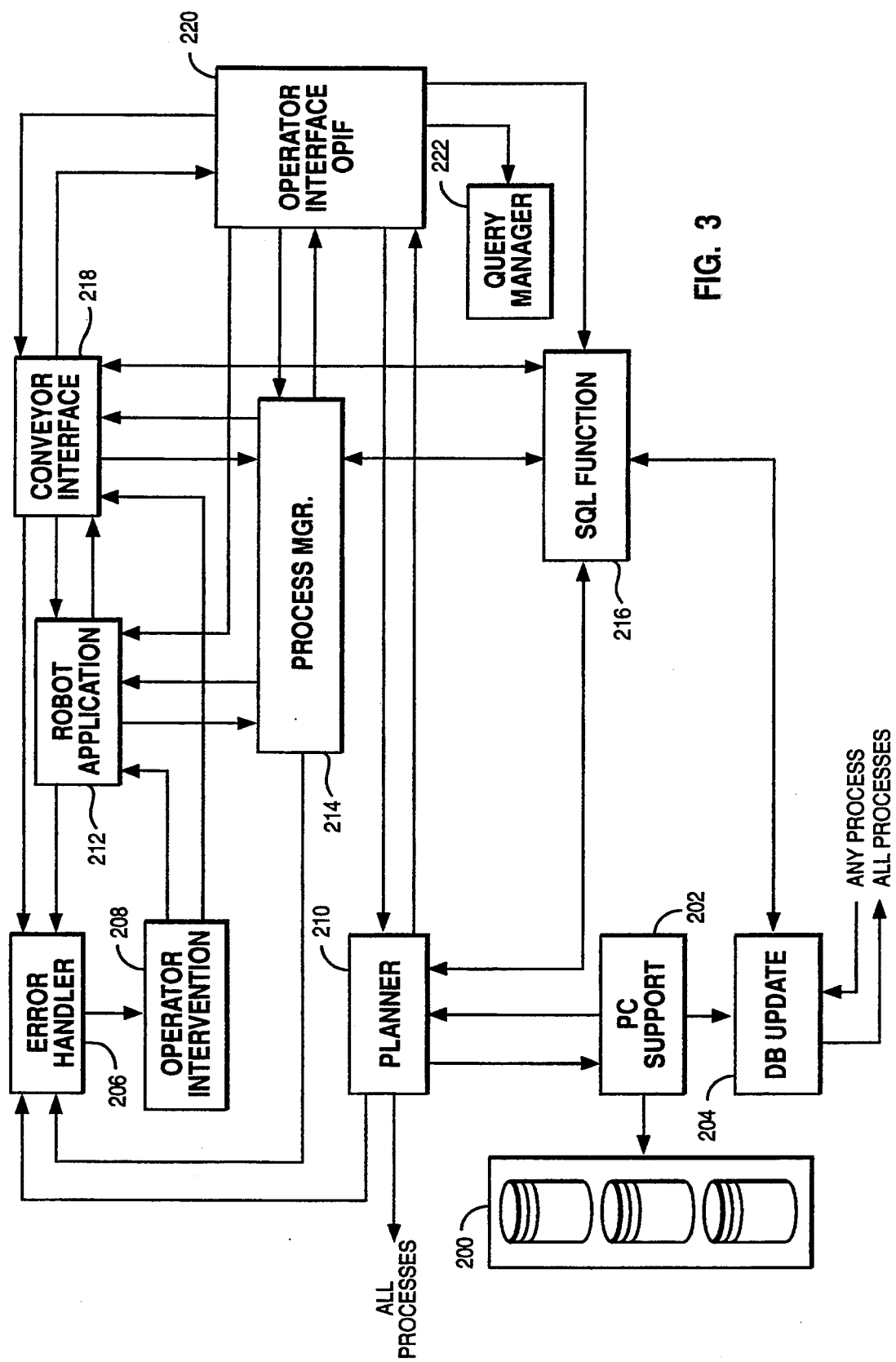
FIG. 3 is a block diagram of the process control of the present invention.

FIG. 3 shows the software architecture that allows the hardware controllers and I/O devices shown in FIG. 2 to operate in conjunction with one another. It should be noted that these processes are also described by the pseudo code attached hereto as appendices A-I.

The control system shown in FIG. 3, consists of high-level processes that execute on picking system controller 102 and the robot controller 104. These processes are compiled separately and independently loaded and executed. They communicate with one another through a common database and through the exchange of asynchronous messages passed by using local area network (LAN) based protocols, or the like. With the exception of the planner and database update process, the remaining processes are continuously executing when the system is operational. The planner and database update process are loaded and executed on command and terminate when their work is completed. Database 200 is used to store information relating to each days production. This data is input to the host computer 100 and downloaded to database 200 and is then accessible by controller 102. A host PC support process 202 is utilized to allow host computer 100 and controller 102 to interface with database 200. Once the next days order file is downloaded to the database 200 from computer 100, the planner process 210 is invoked by host computer 100 to plan the picking and placing of bottles and cases for the next days orders. The planning method is described in detail below in conjunction with FIGS. 8a-8f. In general, the planning method generates a sequence of totes for the robot to fill in a sequence based upon an ordered introduction of individual cases into the work area. Upon completion of the planning method process, the production schedule is then uploaded to the host computer 100 from controller 102, where the planning method is implemented. Controller 102 then waits for the host computer to download the final data file that will include more detail regarding shipping docks, truck assignments and the like for the orders, i.e. data that is not accessed by the planning method. The database updates the process 204 then installs the additional data into the data base 200 such that it is accessible by controller 102, for use during packing slip printing. Next, the robot application 212 is implemented and manages the coordinated operation of the robot 122 and gripper 124 based on the planning method 210. Additionally, the robot application 212 controls the status lights 126 that are used to signal the operator in the event of a robot error. Finally, the robot application also coordinates movement with the conveyor controller 116 via conveyor interface process 218 which communicates directly with the conveyor controller 116. The conveyor interface controls details of the conveyor and its status in comparison with the rest of the system. That is, whether the conveyor is moving totes through the work cell, directing totes into filling positions 14, or the like. The conveyor interface also receives data from the bar code readers 118.

Figure 5:
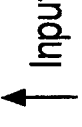
FIG. 5 is a display of the operator interface used in a particular embodiment of the present invention.

The operator interface process 220 which is responsible for user interfaces with the system including status screens on display 110, selection menus, dialogue menus and the like. Operator input is expressed through the menu selection by keystrokes and hand held bar code scanner 108 which causes changes to be made in the database 200 and messages to be passed onto other related processes. The handheld bar code scanner 108 is interfaced to a keyboard port and appears to the operator interface process 220 as additional keystrokes. Of course, a touch screen, stylus, or the like could be used to provide input to the operator interface process and is contemplated by those skilled in the art. One of the primary functions of the operator interface process 220 is to indicate to the operator the sequence of product cases to be loaded on the input conveyor. Menu selections are also provided to start, pause, restart or shut down the system and the operator is able to request reports such as a list of product cases needed for all of the days orders. FIG. 5 is a typical screen generated by operator interface process 220. It can be seen that a field is present for the SKU number which may entered through the keyboard 106 or hand held bar code scanner 108. Information regarding the status of the system is also shown and currently indicates the system is active, the conveyor is on-line, the robot is off-line and the planner process is idle. Information indicating the next case quantity is shown along with the next case configuration from the warehouse where an X indicates bottles or other items that are present and an 0 indicate empty positions. The next brand and quantity field shows a code and a representative brand of items along with the quantity required. In this manner, the operator knows the sequence in which to load input conveyor 26 with warehouse stock. Function keys also allow the process to be exited, help text to be displayed, changes to be made to the case quantity, and the like. Additionally, files can be generated and reports printed regarding the status of the data accessed by the operator interface process. It should be noted that replacement of the operator by an automated flow rack conveyor system is possible and is similarly contemplated by those skilled in the art.

Error handler process 206 controls the handling of error conditions that are detected by other processes and sent as messages to the error handler process. Depending on the configuration and type of error condition, the error handler process 206 may ignore the error, record it in a log file or force the system to stop until the condition is acknowledged by the operator. The case wherein the system stops until the operator acknowledges the condition is referred to as intervention which is passed as a message to the operator intervention process 208 which supervises the presentation of these error condition to the operator via the operator interface process 220, and supervises solicitation of the operator response. The system query (SQL) logic function process 216 is a collection of functions used to store data in SQL tables, manipulate and update the data in the tables and retrieve data from the SQL tables. This data is utilized by the processes shown in FIG. 3 during normal operations. The data stored in the SQL tables is associated with processing the days picking and placement run. Data structures are used by the individual processes to retrieve data from the SQL tables, store data therein and pass data between the processes. The SQL tables include information relating orders, status, brands, cases, totes, customers and the like. Query manager process 222 receives information from an operator interface process 220 and is used to print reports regarding the status of operations such that error conditions, quantities and other data are printed. Finally, the process manager 214 is responsible for retrieving and updating the SQL status tables regarding the robotic application process, update tote records which include assigning a bar code to a tote and entering the actual quantities of brands placed in the tote by the robot. The process manager 214 also prints the tote packing slips which are placed in the tote as they exit workcell 15. In particular, when the robot application process starts, it requests a copy of the system status record from the process manager 214. This copy of the status record is obtained from the SQL status table and sent to the robot application process 212. If the robot application updates the status, the message is sent to the process manager 214 which in turns updates the status record in the SQL status table. As totes are completed by the robot and leave the workcell a message is sent to the process manager 214 indicating the bar code for the tote, from bar code reader 118 and actual quantities of each brand loaded in the tote. The process manager 214 then updates the SQL totes table with this information. When a tote is scanned by a bar code reader when exiting the workcell 15 a message is sent to the process manager 214 requesting a packing list be printed for the identified tote bar code. The process manager then collects the required data and prints the tote packing list.

Figure 4:
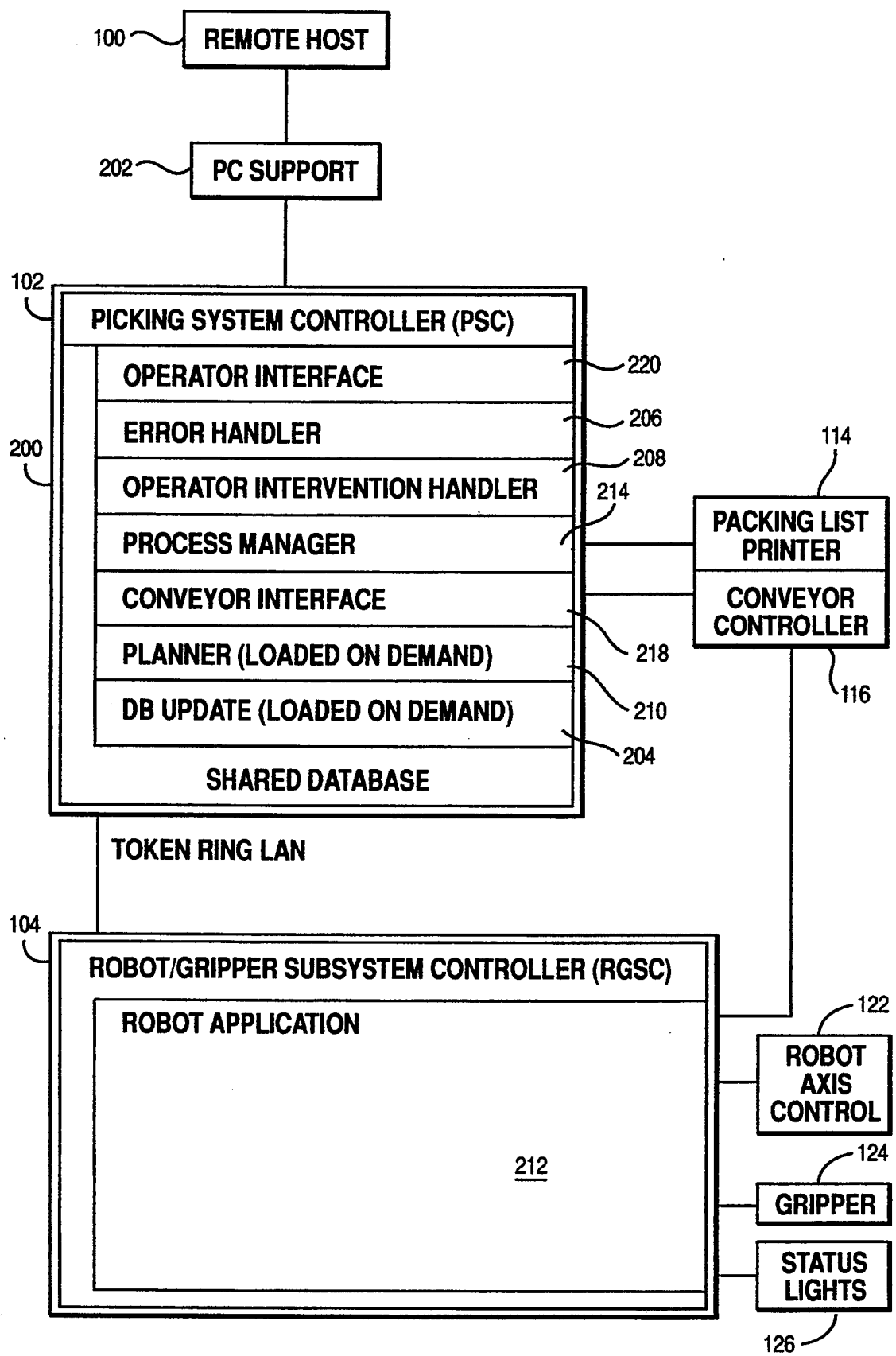
FIG. 4 illustrates the software architecture to control the placement of different type of items in accordance with the present invention.

Referring to FIG. 4, the processes of FIG. 3 and hardware of FIG. 2 are shown in relation to one another. Remote host 100 implements PC support 202 in order to download information to shared database 200. Picking system controller 102 implements the operator interface process to allow for an operator to start the system, print reports, print packing slips, update and add records to the database, view the system error log file, or the like. Error handler 206 determines error conditions and generates messages for the operator intervention handler 208 when operator action is required. The process manager application is implemented on picking system controller 102 and controls packing list printer 114. The conveyor interface process is also run on PSC 102 and supervises conveyor controller 116 which in turn controls the conveyor hardware system. Planner 210 is loaded and run on system controller 102 based on data input from remote host 100 via PC support 202. The database update process 204 is used to add information to the customer order data initially downloaded from remote host 100. The robot controller 104 implements robot application process 212 which takes the order information as set forth by the planner process, and input to DB 200, in the form of a set of tote sequence numbers and the number of bottles required by each tote. A placement schedule is then generated for the robot to follow that will assemble the proper quantity and types of bottles in the corresponding totes. In this manner, the planner method controls the picking of bottles from the input supply units (cases), and their placement in an appropriate transport unit, in accordance with the customer orders. The supply units are sequenced such that the cases that are the most difficult to place, i.e. the cases that have the most customer orders associated therewith, enter the work area 15 first. The planner then causes, via the data input to database 200, the placement of bottles in the appropriate transport unit 20. The robot application 212 is in communication with conveyor controller 116 in order to coordinate the operations therebetween. Additionally, robot application 212 controls the physical movement of the robot by controlling the robot access 122 and robot gripper 124. Additionally robot application 212 supervises the status indication lights 126 to provide data to the operator relating to the current state of the robot.

Figure 6:
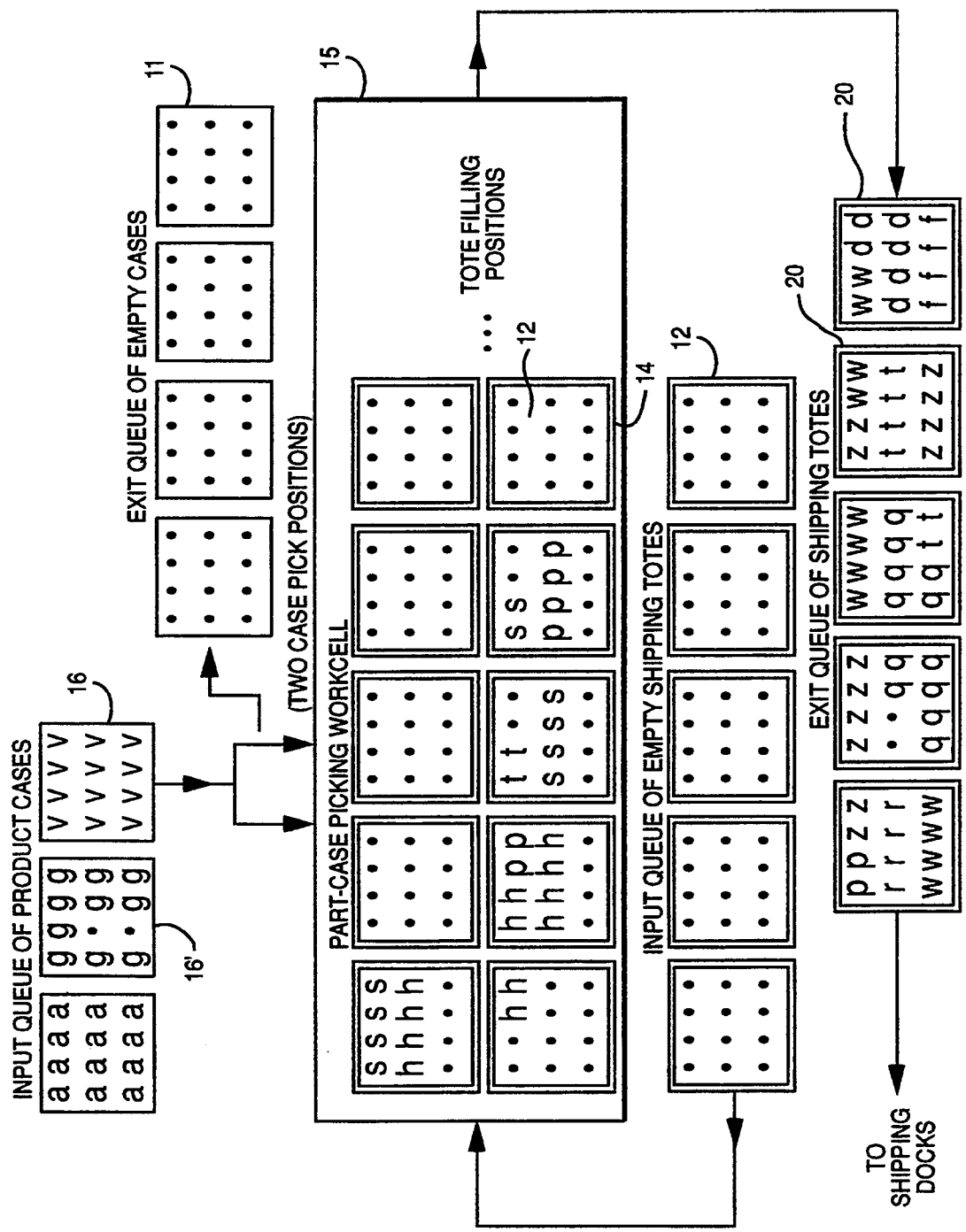
FIG. 6 is a diagram showing transport units and their flow through the work area of the material handling system.

Referring to FIG. 6, a flow diagram illustrates the inputs and outputs to workcell 15. Warehouse stock units 16, e.g. cases of bottles, are input via conveyor 26 to two case pick positions 17 (FIG. 1). Simultaneously, empty shipping totes 12 are input to the work cell 15 along conveyor 10 and directed to designated tote filling positions 14 within work cell 15. The robot then places different brands from the cases 16 into totes 12 based upon the planning method of the present invention. It should be noted in FIG. 6 that letters indicate different brands of items and dots indicate empty positions. Thus, it can be seen that product cases 16 each include one brand which may then be distributed among the totes 12 based on the planning method. Further, it should be noted that not only will the planning method of the present invention distribute partial case quantities among various orders, i.e. one case of product can be distributed in partial case quantities among more than one order, the planning method also anticipates product cases 16 wherein less than a full quantity of products is provided for distribution among the totes 12. Once a case of product 16 is completely distributed among one or more customer orders, the empty cases 11 exit along conveyor 34 for reuse or recycling. The completed totes 20 are then provided with a packing slip and exit workcell 15 along conveyor 18 to a customer pickup area, shipping docks, or the like. It can be seen that the planning method of the present invention allows product cases to be partially distributed among various orders and cases having less than a full quantity of product therein to be placed among orders in partial case quantities.

Figure 7:
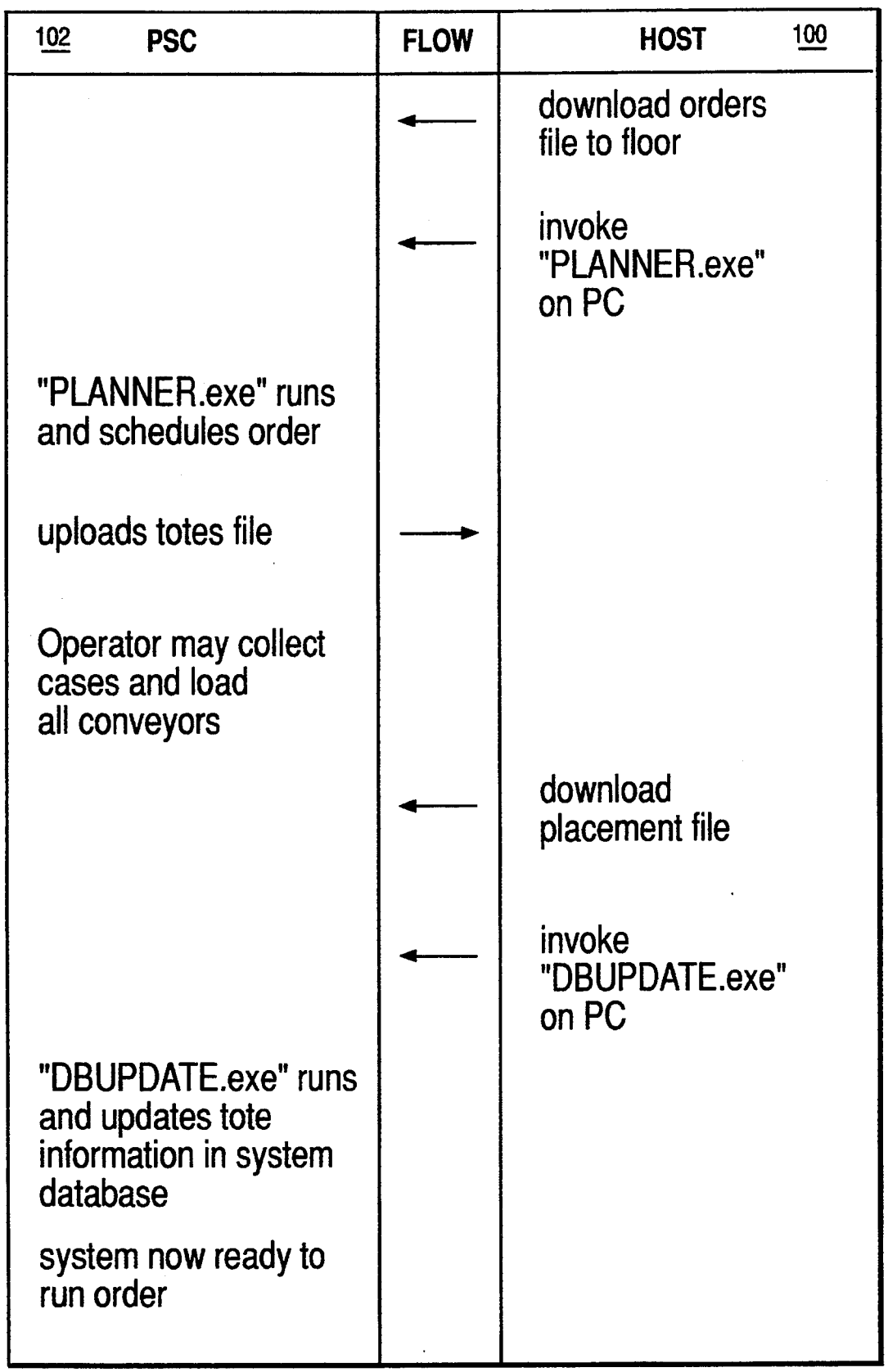
FIG. 7 shows the flow of control between a process control computer and a host computer.
Figure 8A:
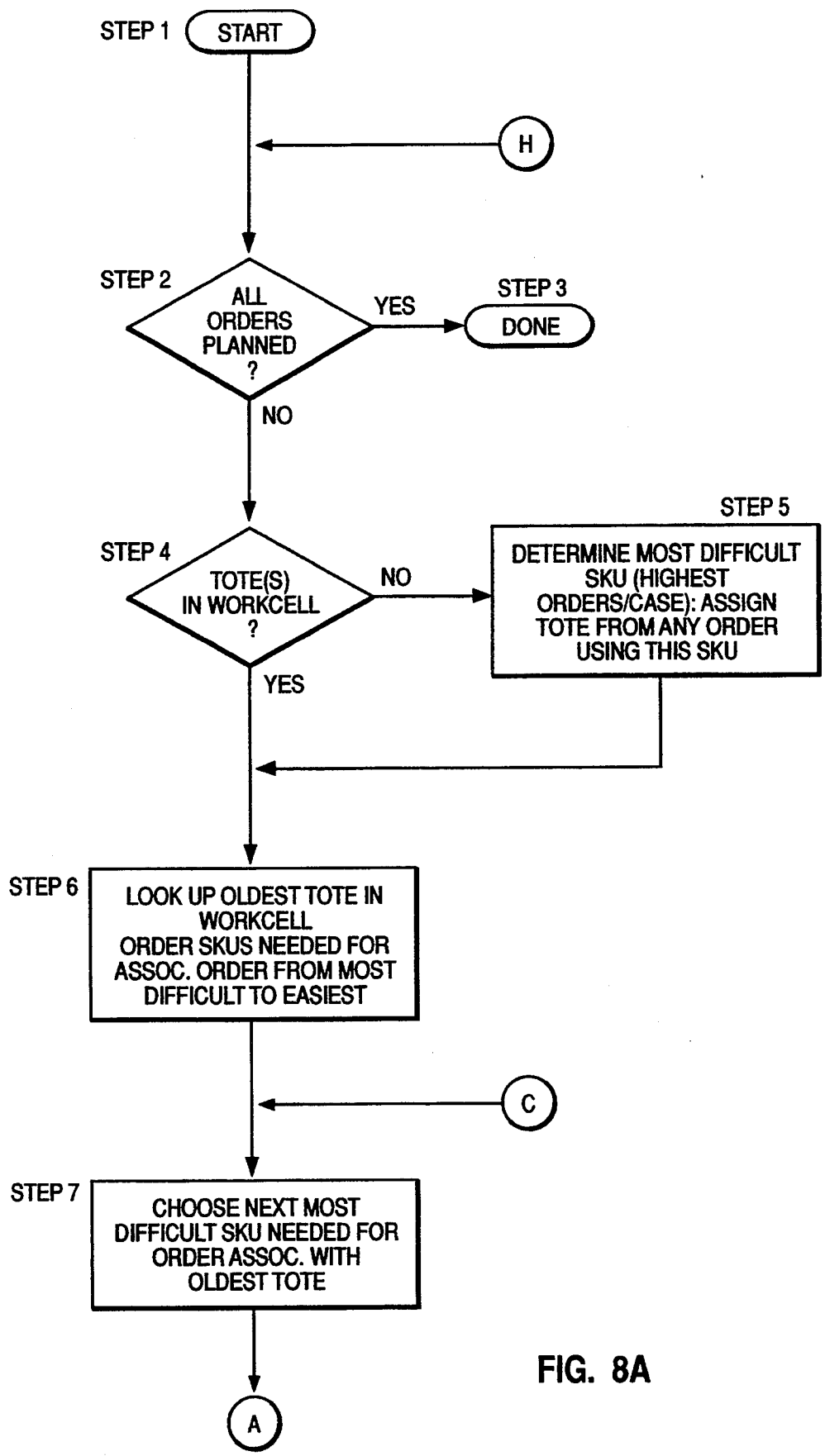
FIGS. 8A–8F are flowcharts that represent the planning method of the present invention.
Figure 8B:
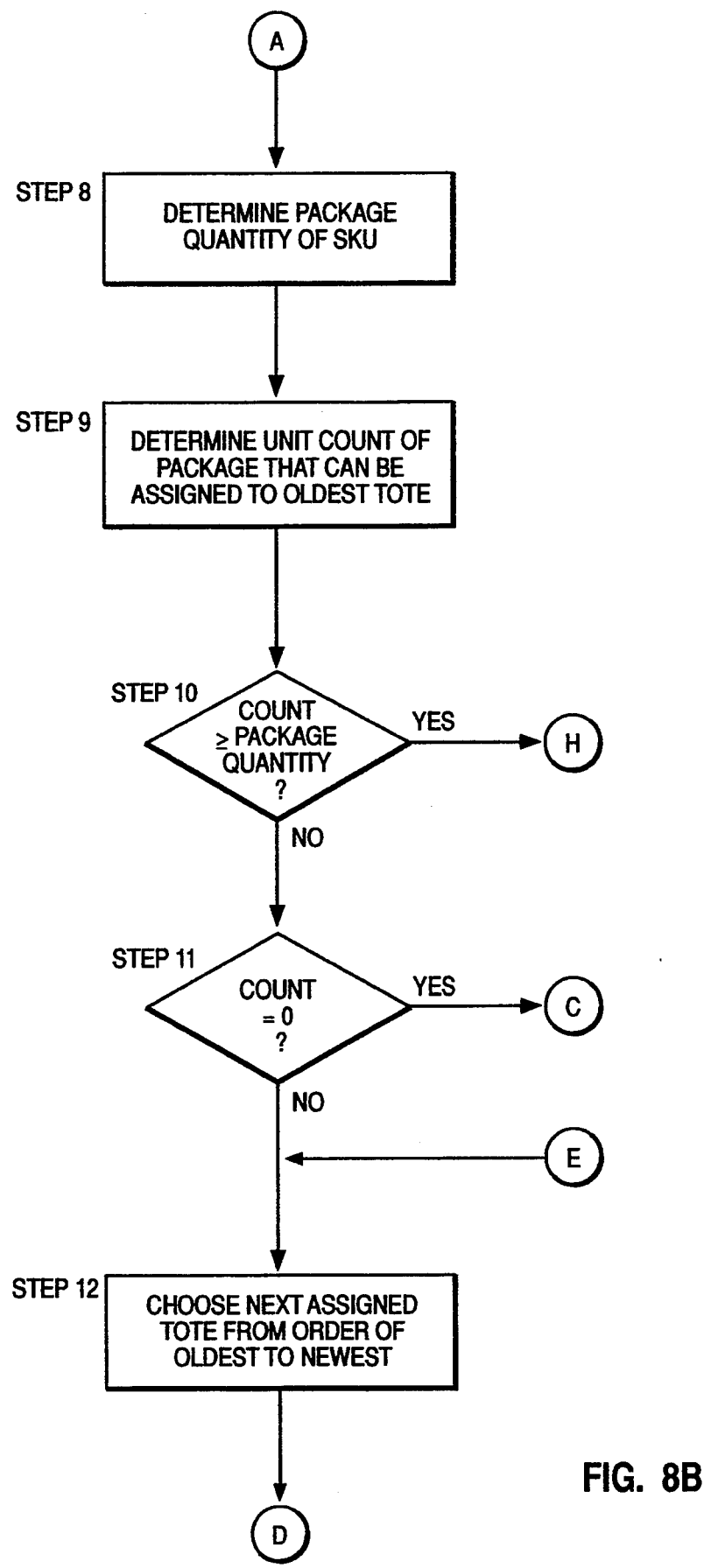
Figure 8C:
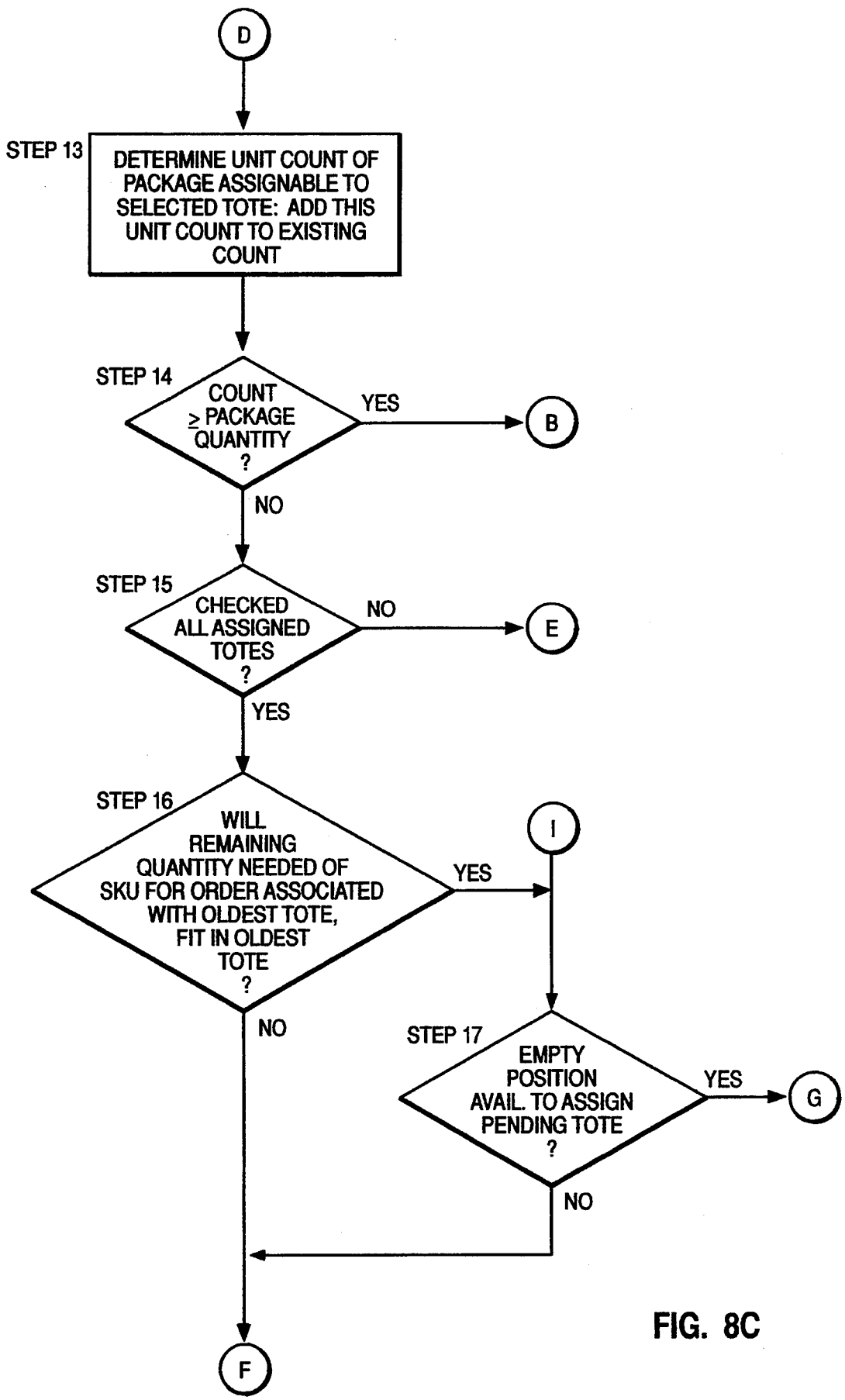
Figure 8D:
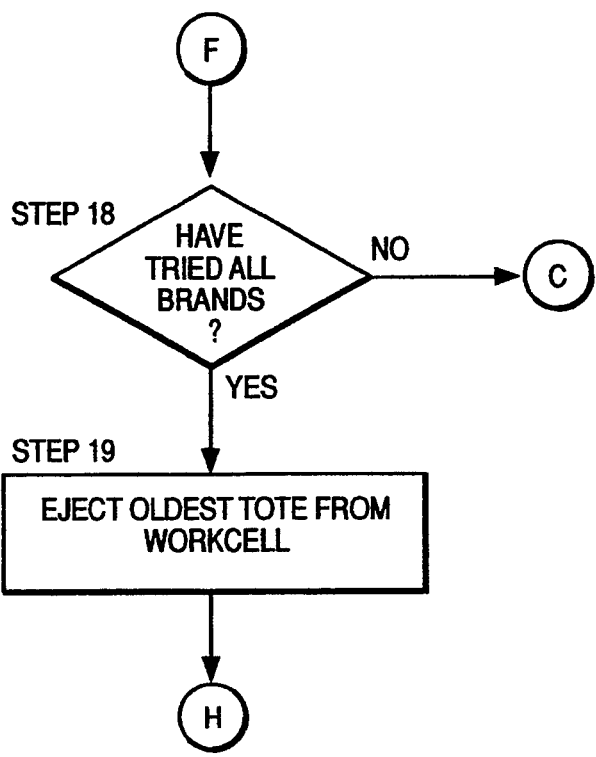
Figure 8E:
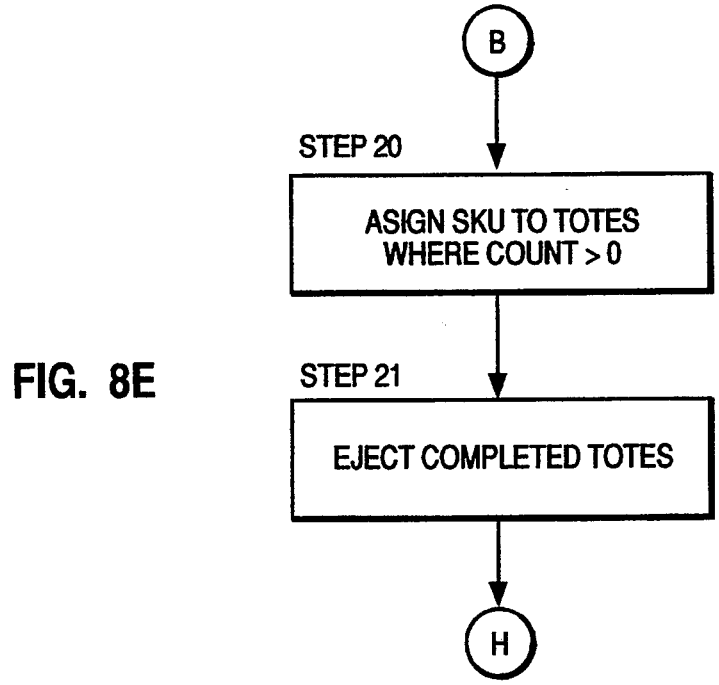
Figure 8F:
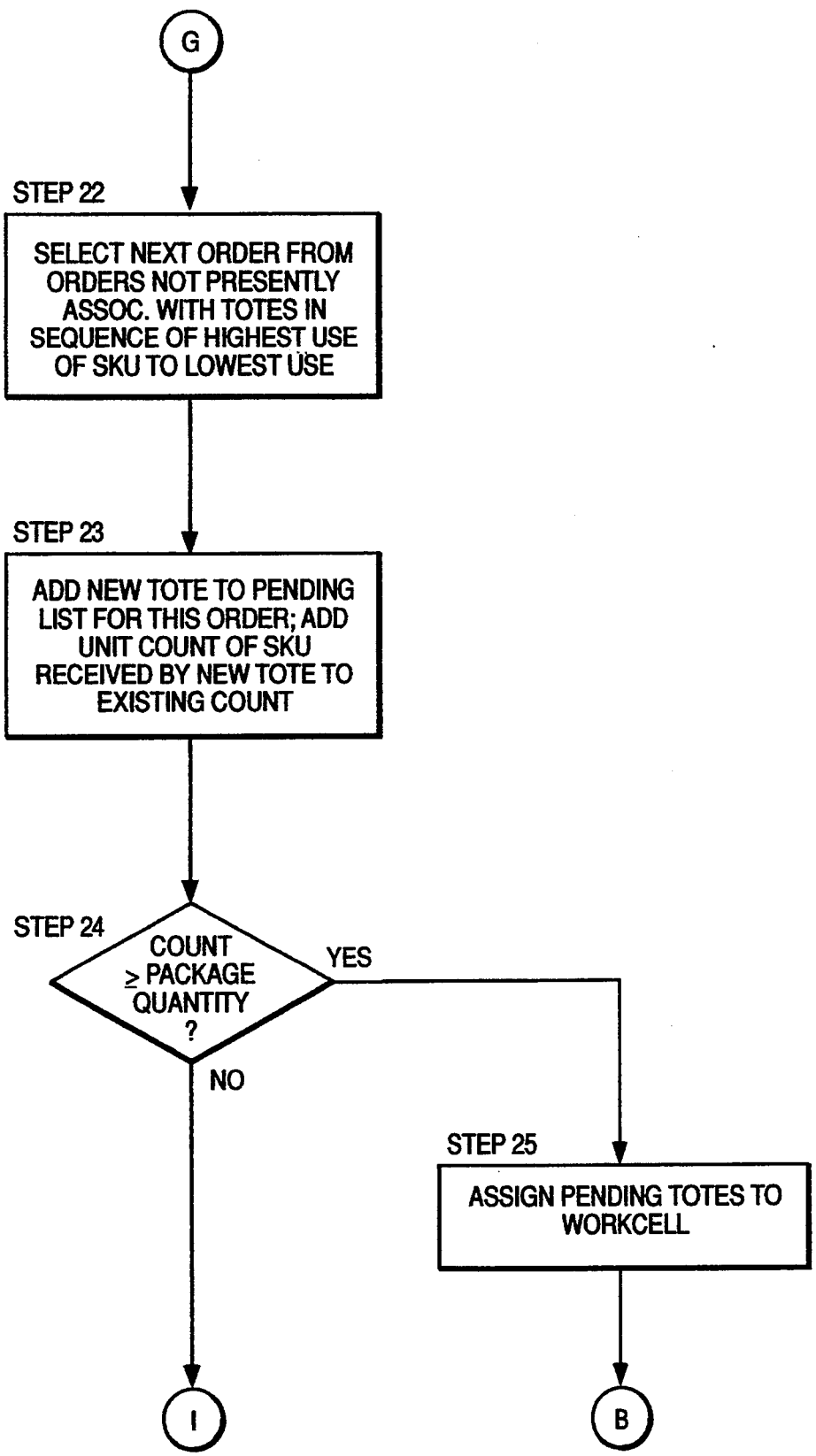

FIG. 7 shows the flow of control between host computer 100 and the picking system controller 102 in order to put the appropriate information in database 200 that will allow the robot picking system to fill customer orders based upon the planning method. Initially host 100 downloads customer orders to the picking system controller 102 which is physically located on the plant floor proximate the workcell 15. Customer orders include information such as a customer number, shipping date, description, quantity, brand code, locator code (where operator can find the brands required), and the like. The host 100 then invokes the executable planner process on picking system controller 102 which in turn runs the planner process and schedules subsequent activities for the robot and conveyor based upon the order files previously provided by host 100. A tote information file is then generated and uploaded to the host system by the planner process. This file includes one record for each brand to be placed in each tote and includes information such as customer number, brand codes, quantity of items ordered, and the like. The host computer 100 then downloads a customer placement file to picking system controller 102 after the tote orders file is uploaded. The placement file specifies from which part of the warehouse a customer's order is shipped, thereby allowing totes to be placed in the most convenient portion of the plant for customer shipping. A customer placement file includes information such as customer number, location in the building from which the order is shipped, bill of lading number, and the like. The host computer then invokes the database update executable process 204 on the picking system controller 102 which runs the process and updates the tote information and the database 200 based upon the placement information previously downloaded from host 100. Subsequent to updating the database 200 with the placement information, the system is ready to run the order.

The planning method of the present invention will now be described with reference to the flow chart of FIGS. 8a–8f. This planning method is a computer executable process and shown in more detail with the accompanying pseudocode of Appendix E. At step 1 the process starts and step 2 determines if all orders to be filled have been planned. If so, the planner method is done and ends at step 3. If, however, all orders have not been planned, then step 4 determines if there are any totes 12 in workcell 15. This determination is made based on the planning of previous customer orders since the planning method executes prior to physical totes being in the workcell. If, at step 4 it is determined that no totes are in the workcell, then the planning method determines the most difficult stock keeping unit, e.g. brand or type of item, to place in the transport unit. Difficulty in placement is determined by the ratio of the highest number of customer requests, or orders, per warehouse stock case, i.e. supply means. That is, a case having 12 bottles therein with 6 customer orders for those 12 bottles (e.g. 2 bottles per order) will be more difficult to place then a case with 12 bottles therein corresponding to a single customer order for the entire 12 bottles. In particular, the difficulty is determined by a statistic which is generated by dividing the number of orders for a particular brand by a number of cases used. The higher the number, the more difficult it is to use the brand since more totes are required from particular orders to be in the workcell at a given time. Once the most difficult SKU is determined, the planning method assigns a tote to the workcell from any order using this particular SKU. At step 6, the planning method finds the oldest tote in the workcell and sorts the stock keeping units by ordering them in a sequence needed to complete the associated customer order (request) from most difficult to the most easiest, using the method of step 5, above. At step 7, the next most difficult stock keeping unit needed to complete the customer order associated with the oldest tote is chosen. The method of the present invention then determines the package quantity of stock keeping unit at step 8. That is, how many units, e.g. bottles are in the case being distributed by the robot to the totes in the workcell. Step 9 then determines the unit count of the SKU package that can be assigned to the oldest tote, i.e. how many bottles from the SKU package can be placed in the oldest tote in the workcell. The package quantity is a predetermined quantity that will usually be a case quantity of the item being placed (i.e. 12 or 24 bottles), but can be any number since the operator can tell the system how many items (bottles) make up the predetermined quantity through the hand held bar code scanner 108. Step 10 then determines if the unit count requirements of the oldest tote in the workcell are greater than or equal to the package quantity and if so, the planning method has placed the entire SKU package, e.g. the entire case of bottles, and the process returns to step 2 to determine if all orders have been planned. However, if the required unit count is not greater than or equal to the quantity in the SKU package, the process continues to step 11 where its determined if the required unit count is equal to zero. If so, the process returns to step 7 because none of the units in the SKU package being considered is required by the oldest tote in the workcell and the process, at step 7, continues to the next most difficult stock keeping unit. If, at step 11, the required unit count is not equal to zero, then it must be less than the package quantity in the stock keeping unit package being considered. At this point, the process at step 12 then chooses the next assigned tote from the sorted order of oldest to newest, i.e. the next oldest tote which has been in the workcell the longest. Step 13, then determines the required unit count for the particular stock keeping units in the package being considered that are assignable to the next oldest selected tote, and then adds this required unit count to the existing count. In this manner, the requirements for the oldest and next oldest tote are combined. The process then, at step 14, determines if the new unit count requirement are greater than or equal to the package quantity and if so the planning method considers the particular stock keeping unit package to be placed and continues to step 20 and assigns the SKUs in the package to totes where the counts are equal to zero. Step 21 then ejects completed totes from the workcell 15 and the process then returns to step 2 to consider another customer order. If at step 14, the count of required units is not greater than or equal to the package quantity then the process continues to step 15 which determines if all of the totes assigned to the workcell have been checked for the particular SKU being considered. That is, have all totes of the ordered list of totes from oldest newest been checked for the SKU being considered. If not, the process returns to step 12 to choose the next assigned tote in order from oldest to newest and determines if any SKUs in the package being considered are required. If all of the totes assigned to the workcell have been checked for the particular SKU, then the process at step 16 determines if the remaining quantity requirements needed to use all of the SKU for the order associated with the oldest tote fit in the oldest tote. That is, are there any empty spaces in the oldest tote that will accommodate the remaining quantity of the stock keeping units. If so, the process continues to step 17 where it is determined if there are any empty positions available in the workcell to assign a pending tote. If so, the process proceeds to step 22 where the planning method selects the next order to be filled from those orders not presently associated with any totes currently in the workcell. These orders are sorted in sequence from highest use of the SKU being considered for placement to the lowest use. At step 22, a new tote is added to the pending list for the selected order and the required unit count of the SKU to be received by the newly assigned tote is added to the existing unit count requirements. At step 24 it is then determined if the unit count requirements are now greater than or equal to the SKU package quantity and if so, the pending tote(s) are assigned to the workcell at step 25. Subsequent to step 25, process proceeds to step 20, as previously described. If at step 24 the required unit count is not greater than or equal to the SKU package quantity being placed, the process returns to step 17 where it is again determined if there are empty filling positions available to assign a pending tote. If so, the planning process of the present invention iterates through steps 17 and 22-25 as previously described. If there are no empty positions in the workcell available to assign a pending tote, the present invention continues to step 18 where it is determined if placement of all the brands has been attempted. In other words, step 18 determines if all of the other stock keeping units on the list, sorted by most difficult to least difficult units to place (determined in step 5) have been tried. If not, the process returns to step 7 and the next most difficult brand, or SKU is chosen for placement. If at step 18 it is determined that an attempt has been made to place all of the stock keeping units on the sorted list, then the oldest tote is ejected from the workcell at step 19. Subsequent to step 19, the method of the present invention returns to step 2 to determine if all orders have been planned and if so ends at step 3.

It is again emphasized that the present invention has been described in terms of stock keeping units which are different brands of bottles and packages that are cases of associated bottles, but it should be understood that the planning and control system of the present invention contemplates use in any kitting type application wherein different types of items are to be combined in specific ways based upon a predetermined allocation. Of course, the different items do not have to be physically configured identically as in the case of bottles since a robot end of arm tool, or gripper, can have different fittings thereon to accommodate differently shaped objects to be picked and then placed in transport units. Further, the present invention provides a system and method where customer orders for partial stock keeping packages (cases) can be accommodated without the need to require customers to order items in specific quantities. That is, customers may order one bottle or 19 bottles of a particular brand and the method of the present invention will place them in transport units associated with that particular customer. Thus, the present invention provides a more efficient distribution system than those currently in use which require customer orders to be in case quantities only.

Attached hereto are appendices A-I which are the pseudocode that corresponds to the processes illustrated in FIG. 3 and previously described with reference thereto. More particularly: Appendix A is the operator interface 220 pseudocode; Appendix B is the error handler 206 and operator intervention 208 pseudocode; Appendix C is the process manager 214 pseudocode; Appendix D is the conveyor interface controller (CIC) 218 pseudocode; Appendix E is the pseudocode for the planner 210 of the present invention; Appendix F is the database update 204 pseudocode; Appendix G is the robot application 212 pseudocode; Appendix H is the query manager 222 pseudocode; and Appendix I is the SQL function 216 pseudocode. It should be understood that this pseudocode is but one example of a method for controlling the picking and placement of items from stock units into transport units and does not limit the scope of the present invention to this example.

Although certain preferred embodiments have been shown and described, it should be noted that many changes and modifications can be made therein without departing from the scope of the appended claims.

APPENDIX A

```
Operator I/F

Static Memory data (data that opif will keep in memory)
    Key D — if also kept on disk status_rec    stat case_rec      next_cases3 — first1,second2,third3 cases to be loaded long          last_input_case —last case sequence number loaded by
                                       the operator int           input_clear = TRUE   — this flag is set true everytime a
                                              case clears the input queue
                                    FALSE  — this flag is set false everytime
                                              the operator interface tells the
                                              Conveyor interface to load a case Note: initial value is TRUE initialization
      Begin
```

```
(71) get_status(status_rec read last_input_case from disk
    if disk file does not exist then
     write last_input_case = 0 to file if last_input_case != 0
     then
       get_next_3_cases()
     else
       blank fields in all 3 next_cases array initialize IPCOM communications End get_next_3_cases()
 Begin
    (72) open_input_cases(last_input_case)
    for index 1 to 3
      Begin
       if ((73) fetch_next_input_case (next_casesindex,long i) != Got it )
         then
           blank fields in next_casesindex
      End if (next case does not have dimension in database)
          then
            force operator to update case dimension table

(74) close_input_cases()
    End main dialog initialization
    Begin
      load accelerator function key table
      update case configuration (next_case1.case_qty)

refresh display

End update case configuration (unsigned int : case_qty)
    Begin
    ' update the case configuration screen and qty information 4 wide line 1 ————> X X X X    3 deep
         line 2 ————> X X X X
         line 3 ————> X X X X case of case_qty
         1 : Begin
             line 1 = "0 0 0 0"
             line 2 = "0 X 0 0"
             line 3 = "0 0 0 0"
            End
```

```
    2 : Begin
          line 1 = "O O O O"
          line 2 = "O X X O"
          line 3 = "O O O O"
        End
    3 : Begin
          line 1 = "O O O O"
          line 2 = "X X X O"
          line 3 = "O O O O"
        End
    4 : Begin
          line 1 = "O O O O"
          line 2 = "X X X X"
          line 3 = "O O O O"
        End
    5 : Begin
          line 1 = "O X O O"
          line 2 = "X X X X"
          line 3 = "O O O O"
        End
    6 : Begin
          line 1 = "O X O O"
          line 2 = "X X X X"
          line 3 = "O O X O"
        End
    7 : Begin
          line 1 = "O X X O"
          line 2 = "X X X X"
          line 3 = "O O X O"
        End
    8 : Begin
          line 1 = "O X X O"
          line 2 = "X X X X"
          line 3 = "O X X O"
        End
    9 : Begin
          line 1 = "X X X O"
          line 2 = "X X X X"
          line 3 = "O X X O"
        End
   10 : Begin
          line 1 = "X X X O"
          line 2 = "X X X X"
          line 3 = "X X X O"
        End
   11 : Begin
          line 1 = "X X X X"
          line 2 = "X X X X"
          line 3 = "O X X X"
        End
   12 : Begin
          line 1 = "X X X X"
          line 2 = "X X X X"
          line 3 = "X X X X"
        End End
Case Operator input (1) View Error Log
        Begin
            Call ALPS function to Display error log file
        End
```

(2) Add to Brand Table
    Begin
        Call ALPS function to run QM panel BRAND add mode (32)
    End (3) Update Brand Table
    Begin
        Call ALPS function to run QM panel BRAND update mode (33)
    End (4) Warehouse Pick List Report (case table sorted by locator code)
    Begin
        Call ALPS function to run QM query WPLR (30)
    End (5) case Pick Report(case table sorted by case sequence)
    Begin
        Call ALPS function to run QM query casePR (31)
    End (6) Print Tote Packing Slip
    Begin
        Load a Dialog to get a tote id to print
        if got a good tote id
          then
            IPC40.tote_barcode = tote id entered
            send msg to process manager to Print Tote Packing Slip (40)
    End (7) Print Unprocessed Totes Packing Slips
    Begin
        send msg to process manager to
        Print Unprocessed Totes Packing Slips (54)
    End (8) System Start
    Begin
      if (stat.system = Ready)
        then
          display "Are you sure"
          get operator response (yes / no)
          if yes
            then
              if (stat.robot = online)
                then
                  send msg to Robot I/f to change state to offline(41)

get_next_3_cases()

update display to show next 3 cases
              (show case configuration for the next case)

update stat.system = Active
              (75) update_status (stat)
              send broadcast msg-status record updated (42)

if the next case to load does not have qty of 12
                (next_cases[1].case_qty != 12)
                then
                  beep speaker (warning tone)
                  display "Note: the next case to load is
                          a partial qty case", OK

```
            else
                display "System is not in Ready State"
        end (9) System Shutdown
    Begin
       if (stat.system = Active)
          then
            ask operator "Are you sure ?"
            if response = yes
               then
                  stat.system = Shutdown
                  (75) update_status (stat)
                  send broadcast msg-status record updated (42)
                  close all files
                  set program termination flag
            else
               display "system is not active"

End

(10) Terminate Production - Immediate
     Begin
        if (stat.system = Active)
           then
             ask operator "Are you sure ?"
             if response = yes
                then
                   stat.system = Shutdown
                   (75) update_status (stat)
                   send broadcast msg-status record updated (42)
                   close all files
                   set program termination flag
                   Kick out all totes
             else
                display "system is not active"

End
(10) Terminate Production - Dry-Up

Begin
        if (stat.system = Active)
           then
              display "Production Termination! Are you sure?"
              if yes
               then
                 stat.last_case_seq_num = last_input_case
                 update stat.system = Termination_pending
                 (75) update_status (stat)
                 send broadcast msg-status record updated (42)
                 blank the next 3 cases
                 update display showing no cases to be loaded else
               display "System must be in Active State"
        end
     End
```

```
(11) System Re-Start
     Begin
        if (stat.system = Shutdown)
           then
              ask operator "Are you sure ?"
              if response = yes
                 then
                    update stat.system = Active
                    (75) update_status (stat)
                    send broadcast msg-status record updated (42)

get_next_3_cases()

update display to show next 3 cases
                    (show case configuration for the next case)

if the next case to load does not have qty of 12
                       (next_cases1.case_qty != 12)
                       then
                          beep speaker (warning tone)
                          display "Note: the next case to load is
                                         a partial qty case", OK else
              display "System is not in a Shutdown state"

End

(12) Robot Pause
     Begin
        ask operator "Are you sure ?"
        if response = yes
           then
              send msg to Robot I/F to change state to offline
              (41) Change Robot State
     End

(13) Robot Resume
     Begin
        ask operator "Are you sure ?"
        if response = yes
           then
              send msg to Robot I/F to change state to online
              (41) Change Robot State
     End

(14) Conveyor Pause
     Begin
        ask operator "Are you sure ?"
        if response = yes
           then
              send msg to Conv I/F to change state to offline
              (43) Change Conveyor State
     End

(15) Conveyor Resume
     Begin
        ask operator "Are you sure ?"
        if response = yes
           then
              send msg to Conv I/F to change state to online
              (43) Change Conveyor State
     End

(16) Enter/Scan case UPC Label
```

```
Begin
  enter/scan into ---> upc_num if nothing pending on the conveyor input queue
      (input_clear = TRUE)
    then
      if (stat.system != Active)
        then
          beep speaker (error tone)
          display "System is not Active, you cannot enter a case"
          blank the last upc number just scanned on the
          display
        else
          if (stat.conveyor = offline)
            then
              beep speaker (error tone)
              display "the case cannot be enter because the conveyor
                      is offline"
              blank the last upc number just scanned on the
              display else
              matched = false
              for index = 1 to 10
                Begin
                  if (upc_num = next_cases1.upc_codesindex)
                    then
                      set matched = true
                      break for loop
                End
              if (matched = true)
                then
                  beep speaker (good tone)

indicate that a input is in progress
                  input_clear = FALSE send msg to conveyor to input case (44)

last_input_case = next_case1.case_seq_num
                  write last_input_case to disk get the next three case records for input
                  and update display to show the case configuration
                  on the next case 1 to be entered get_next_3_cases()
                  update case configuration (next_cases1.case_qty)

blank the last upc number just scanned on the
                  display if the next case to load does not have qty of 12
                    (next_cases1.case_qty != 12)
                    then
                      beep speaker (warning tone)
                      display "Note: the next case to load is
                              a partial qty case", OK
```

```
            else
              beep speaker (error tone)
              display "this is not the correct case to be
                      entered next.
                      expected : brand description & qty" ,
                    next_case1.brand_descr,
                    next_case1.case_qty , Ok
              blank the last upc number just scanned on the
              display else
        beep speaker (error tone)
        display "previous case has not cleared input queue"
        blank the last upc number just scanned on the
        display End

(17) Enter partial qty for a case
     Begin load a dialog to get new qty
        if (new qty <= 0) or (new qty >= next_cases1.case_qty )
        then
          display "invalid qty selected" Ok
        else
          difference = next_cases1.case_qty - new qty
          next_cases1.case_qty = new qty for index = 1 to 6
            Begin
              if (next_cases1.case_bomindex.tote_qty >= difference
              then
                 next_cases1.case_bomindex.tote_qty =
                    next_cases1.case_bomindex.tote_qty - difference
                 break for loop
              else
                 difference = difference -
                         next_cases1.case_bomindex.tote_qty next_cases1.case_bomindex.tote_qty = 0
            End for

(77) update_case_qtys (next_cases1)

update case configuration (next_cases1.case_qty)

End

(18) Missing Case
     Begin
        Ask the operator -
        "Are you sure Brand descr & qty is unavailable" Y/N
        if yes
        then
           set next_cases1.case_qty = 0

/* Zero (0) out all tote qty's associated with case */
           for index = 1 to 6
             Begin
               next_cases1.case_bomindex.tote_qty = 0
             End
```

```
            (77) update_case_qtys (next_cases1)

last_input_case = next_case1.case_seq_num
            write last_input_case to disk get the next three case records for input
            and update display to show the case configuration
            on the next case 1 to be entered get_next_3_cases()
            update case configuration (next_cases1.case_qty)

if the next case to load does not have qty of 12
              (next_cases1.case_qty != 12)
                then
                  beep speaker (warning tone)
                  display "Note: the next case to load is
                           a partial qty case", OK End

(19) Help
        Begin
          ALPS function to display Help information for the main dialog
          show help panel - main dialog
        End

(20) Exit
        Begin
           if (stat.system = Idle)
             then display "Exiting the System!  Are you sure?"
                If yes
                  then
                    send a stop process msg to all system processes (45)
                    close all files
                    set program termination flag
             else
                display "System must be in Idle state!"
           end
        End Case of IPCOM Msg B(42) Status record updated
        Begin
          update internal memory copy (stat) with new status update display to show new status
        End S(44) Input case
        Begin
          -indicate that the previous case has cleared the input spur
          input_clear = TRUE
        End
```

APPENDIX B

```
case of IPCOM message
Begin

(90) no case in holding state at check point 2
       Actions
           write error to error log

(91) incorrect case check point 2 (robot staging)
       Actions
           write error to log file
           display "expecting brand , qty"

Actions
           write error to log file
           select
                   1. operator inserts correct case -send conv try again
                       send retry scan msg to conv i/f for ck pt 2 (48)

2. operator identifies the case is missing
                      so operator intervention
                      has to
                      tell conv to modify the info it has on the
                      case currently at the scanner send Missing Case at Ck pt 2 to Conv i/f (53)

(92) bad scan at check point 2 (robot staging)
        display "expecting brand , qty"

Actions
           write error to log file
           select
                   1. retry
                      send conv try again send retry scan msg to conv i/f for ck pt 2 (48)

2. Accept as is
                      send accept case msg to conv i/f (49)

3. operator identifies the case is missing
                      so operator intervention tell conv to modify the info it has on the
                      case currently at the scanner send Missing Case at Ck pt 2 to Conv i/f (53)

(93) bad scan at check point 4 (tote input)
       Actions
           write error to log file
           select
                   1. Retry
                      send retry scan msg to conv i/f for ck pt 4 (48)
```

(94) three consecutive bad scans at check point 6
    Actions
        write error to log file
        Show help file
        "fix scanner "

(95) bad scan at check point 6 (tote output)
    Actions
        write error to log file

(96) error in order file — operator intervention
    Actions
        write error to log file
        display "Severe errors have been detected in the Host order file.
        Please have the AS/400 Host system transfer a new copy of the order
        file to the module controller."

(97) error in order file
    Actions
        write error to log file

(98) broken or lost bottle
    Actions
        write error to log file
        operator verifies actual number of bottles transferred
        send bottles placed message to robot (55)

(99) power off to robot
    Actions
        write error to log file
        display "please restore power to the robot and select
                Resume from the Robot menu under Production
                Utilities."

(100) wrong case layout
    Actions
        write error to log file
        display "bottles in the case on the (right or left) side are not
                in the proper orientation. Please correct and select
                Resume from the Robot menu under Production Utilities."

(101) Robot tool error
    Actions
        write error to log file
        display "an error with a robot gripper tool
                has been detected. Please check the robot display
                for more details on how to proceed, then select
                Resume from the Robot menu under Production Utilities."

(102) unknown brand
    Actions
        write error to log file
        display help file panel
        "unknown brand"

```
(103) three consecutive bad scans at cp4
    Actions
        write error to log file
        display help file panel
        "fix scanner"

(104) low cases
    Actions
        write error to log file (105) low cases clear
    Actions
        write error to log file (106) low in totes
    Actions
        write error to log file (107) low in totes clear
    Actions
        write error to log file (108) full out totes
    Actions
        write error to log file (109) full out totes clear
    Actions
        write error to log file (110) case jam
    Actions
        write error to log file
        display help file panel
        "case jam in <side> robot work enclosure"
```

Appendix C

```
Process Mgr

Static Memory data status_rec    stat initialization ()
  Begin
    (71) get_status (status_rec)
    initialize IPCOM communications
  End Case of IPCOM Msg S(40) Print Tote Packing Slip
        Begin packing_slip_rec.tote_barcode = IPC40.tote_barcode
```

```
            if ( (70) get_packing_slip(packing_slip_rec)=GOT IT)
              then
                if last tote
                  packing_slip_rec.total_num_of_totes
                          equal (=)
                  packing_slip_rec.customer_tote_num then
                      print <packing slip for last tote from packing_slip_rec>
                    else
                      print <packing slip from packing_slip_rec>
                else
                  print <error printing IPC40.tote_barcode>
            End

(41) Change Robot State
        Begin
          stat.robot = IPC41.state
          (75) update_status(stat)
          send broadcast msg-status record updated (42)
        End B(42) status record updated
        Begin
          update internal memory copy stat with new status
        End SW(46) get status record
        Begin
          IPC46.status = stat /* assign our memory version */
          send reply to robot i/f (46)
        End S(51) tote complete    (from robot)
        Begin
          (81) update_tote_rec (IPC51)

if (IPC51.last_tote_flag = TRUE)  - last tote of the day then
              wait(configurable time value) (i.e. 30 minutes)
              stat.system  = Idle ...we are finished for the day
              stat.planner = Idle
              (75) update_status(stat)
              send broadcast msg-status record updated (42)

End

S(54) Print Unprocessed Totes Packing Slips
        Begin

(83) open_unproc_totes ()
          while (forever)
            Begin
              if ((84) fetch_unproc_totes(packing_slip_rec)=GOT IT)
                then
                  if last tote
                    packing_slip_rec.total_num_of_totes
                            equal (=)
                    packing_slip_rec.customer_tote_num
```

```
            then
               print <packing slip for last tote from packing_slip_rec>
            else
               print <packing slip from packing_slip_rec>
    End (while forever)

(85) close_unproc_totes ()

End
```

Appendix   D

Static Memory data

```
  status_rec    stat output_case_rec   next_output_case - conveyor keeps in memory the
                                        next case to be scanned at
                                        check point 2 (robot staging)

int          comm_flag   - communication flag to the conveyor system
                              online , offline int          first_time_flag - this flag is used to determine when the
                                  first case has been entered at the
                                  input spur just after the system has
                                  gone from a Ready state to a Active state.
                                  This allows us to prime for the first case
                                  that will show up at the scanner check
                                  point 2. (next_output_case)

long         last_output_case - this is the last case seq number that
                                   was verified for input into the robot
                                   staging area Left Queue (disk file)         - this queue contains the case queued
                                    up for the robot on the left side Right Queue (disk file)        - this queue contains the case queued
                                    up for the robot on the right side int     last_queue_used  = (L or R) (0 or 1)
                              this var indicates the last side
                              or Queue Left or Right ..the
                              conv I/F used.
                                note: next side robot should
                                       work from will be the R -right int     ck_pt_6_bad_scan_count - number of consecutive bad scans
                                    at check point 6 (tote output)

Two Fast Tables (disk files)

tote location information in the robot work area

Tote_Storage_table (record 1 - 28)
      tote_store_record
        Begin
          location number - key
          tote barcode tote spur status End
```

```
        status information

Status_Storage_table (record 1 - 2)
      status_store_record
        Begin
          item number - key
          item status
        End Structures

- passed to CP3 robot staging monitor thread
     Record robot_work_rec
       Begin
         queue - robot staging side
         op    - load or remove
       End initialization
Begin initialize SQL database
   open circular file log
   (71) get_status (stat)
   initialize fast table - tote_location_table
   if no records in the table ..fast table current count
     then
        - initialize the table records -
        for index = 1 to 28 locations
         Begin
           tote_store_record.location = index
           tote_store_record.barcode  = NULL tote_store_record.status = TOTE_SPUR_EMPTY End initialize tote storage status initialize input queues
   initialize IPCOM communications read last_output_case from status table
   if no entry in table then
     write last_output_case = 0 to status table read last_queue_used from status table
    if no entry in table then
      write last_queue_used = L to status table first_time_flag = TRUE if last_output_case != 0
     then
   if stat.system = Active or Shutdown Pending
     then
        (78) open_output_cases(unsigned int : last_output_case)
        first_time_flag = FALSE get next output case (next_output_case)
```

```
    initialize PLC communications
    start conveyor monitor threads

End shutdown
Begin close fast tables
    close SQL output case cursor
    close SQL database End Conveyor main
  Begin
    Conv I/F initialization
    start initialize static display elements
    while (program termination flag = false)
      begin
        update dynamic display elements
        sleep for interval
      end Conv I/F shutdown
  End queue output case record (output_case_rec)
   - this function alternates queueing the case records between the
     right and left queues.

Begin
    case of last_queue_used
       (L)eft : Begin
                  put output_case_record into Right Queue
                  last_queue_used = Right
                  write last_queue_used to disk
                End (R)ight : Begin
                  put output_case_record into Left Queue
                  last_queue_used = Left
                  write last_queue_used to disk
                End End
  check for last case (next_output_case)
    Begin
      - this routine checks to see
         if case is this last case of the day ...if it is then
         update the status record to indicate that the last case
         has been processed and clear some of the program variables that
         are no longer required.
         (return TRUE - last case , FALSE = not last case)
```

```
   if (next_output_case.last_case_flag = 1)
     then
        stat.last_case_processed = TRUE..1
        (75) update_status (stat)
        send broadcast msg-status record updated (42)

close out some things...where almost done

(80) close_output_cases()
        last_output_case = 0
        write last_output_case to disk
        first_time_flag = TRUE return TRUE to caller else
        return FALSE to caller - not last case end get next output case (next_output_case)
Begin
    this routine gets the next physical case that should show up at the
    scanner at check point 2.
    Note: any missing/phantom cases are simply queued for the robot do
    Begin
       (79) fetch_next_output_case (next_output_case)

Check to see if this is the last case of the day if (next_output_case.case_seq_num >= stat.last_case_seq_num)
         then
            next_output_case.last_case_flag = 1 - this is the last case
         else
            next_output_case.last_case_flag = 0 - this is not the last case check to see if the case qty > 0
       if the next case is a missing case then
       act like it's really there and queue it up for the
       robot --note: the robot may have totes to eject.
         if (next_output_case.case_qty <= 0)
            then
               queue output case record (next_output_case)
               last_output_case = next_output_case.case_seq_num
               write last_output_case to disk if this case is the last case of the day then
               update the status record to indicate that the last case
               has been processed check for last case (next_output_case)

End
     while (next_output_case.case_qty <= 0)
                AND
           (next_output_case.last_case_flag = 0)
  End
```

```
get next store location ()
- this function tries to find an available storage location in the
  tote storage area.(check point 5)

Note: this function return a location to store the tote (1 to 28)
        or 0 if no location is available Begin
  -try and find a location close to the robot location = 21 fast table get (tote_location_record)
  - if nothing in location -
  if (tote_location_record.occupied = FALSE)
    then
      return (location) to caller
      exit function Repeat above code for the following locations until a empty location
  is found......

location = 22            location = 18
    location = 7             location = 3
    location = 8             location = 12
    location = 9             location = 26
    location = 6             location = 17
    location = 20            location = 2
    location = 23            location = 13
    location = 5             location = 27
    location = 10            location = 16
    location = 24            location = 1
    location = 19            location = 14
    location = 4             location = 28
    location = 11            location = 15
    location = 25
    else return (0) - no location available End Case of IPCOM Msg B(42) status record updated
         Begin
           if system status changes from ready to active
           then sync with robot on which side it will pull from next
           (the robot will always start pulling from the right side
           once the line is started from a ready state)

if (stat.system = Ready) AND (IPC42.system = Active)
             then
                last_queue_used = L   - note: next side robot should
                                              work from will be the
                                              R -right write last_queue_used to disk clear Left and Right Queues update internal memory(stat) copy with new status End
```

```
S(43)  Change Conveyor State
         Begin
           stat.conveyor = IPC43.state
           (75) update_status (stat)
           send broadcast msg-status record updated (42)

set comm_flag = IPC43.state   /* stop communications with the  */
                                         /* conveyor system               */
                                         /*        or                     */
                                         /* start communications with the */
                                         /* conveyor system               */

End

S(44) Input Case (Check point 1 - case input spur)
         Begin
           if we have not yet read in the initial output case record
           then do it now ..once the first case has been input if (first_time_flag = TRUE)
              then
                (78) open_output_cases(unsigned int : last_output_case)
                get next output case (next_output_case)
                first_time_flag = FALSE start -->Check point 1 thread to input case End
   S(45) Stop process
         Begin
           close all files
           close all cursors
           shutdown process
         End SW(46) Get next robot case
         Begin robot_work_rec.queue = IPC46.queue
           robot_work_rec.op = I_GET_NEXT_CASE start --> check point 3 thread to verify case available
                      for robot End S(48)   Retry Scan (from opinv)
         Begin
           case of IPC48.check_point_number check point 2: Begin
              number      :- tell PLC to retry scan
                          read PLC ck pt 2 command reg
                          if command reg = CP2_HOLD_CASE (2)
                            then
                              set PLC ck pt 2 command reg = CP2_RETRY_SCAN (3)
                          end end case End
```

```
S(49)  Accept Case   (check point 2 from opinv)
       Begin
         read PLC command reg

- is a case in a hold state -
         if command reg = CP2_HOLD_CASE (2)
           then
              start --> Check point 2A thread to move the case
                       into the (last_queue_used)

else
              (90) error msg -> <no case in holding state at check point 2>

End

S(50)  Remove tote (msg from robot (check point 5))
       Begin

- tell PLC to remove tote from the specified location poll
           until ck pt 5 command register = CP5_REMOVE_ACKNOWLEDGED (0)
           set ck pt 5 location register = IPC50.location
           set command register = CP5_REMOVE_TOTE (1) - remove tote End S(53)  Missing Case at Ck Pt 2   (from opinv)
       Begin

- Zero out next_output_case qtys - set next_output_case.case_qty = 0

/* Zero (0) out all tote qty's associated with case */
         for index = 1 to 6
           Begin
             next_output_case.case_bomindex.tote_qty = 0
           End queue output case record (next_output_case)

get next output case (next_output_case)

set PLC command register = CP2_READY_FOR_CASE (0)

End

S(58)  Remove Case at Ck Pt 3   (from robot)
       Begin
         robot_work_rec.queue = IPC58.queue
         if IPC58.queue work envelope is not occupied
           begin
             - prime case work envelope by loading a case
             robot_work_rec.op = CP3_LOAD_CASE
           end
         else
           begin
             - remove case from robot work envelope, and then
             - load next case
             robot_work_rec.op = CP3_REMOVE_CASE
           end
```

```
            start --> start case transfer, and then invoke check point
                     3 thread to monitor case transfer completion End End Case of IPCOM Msg Conveyor Monitor Threads
Each of the following functions will be threads running under Conv I/F
process Command Register Polling
  Begin while( forever)
      begin
        read PLC command register block into regs (global memory)
        sleep 50 msec
      end
  End Check Point 1 (case input)
   Begin
      --Instruct Conveyor(PLC) to move the case thru check-point 1
      --Wait for Conveyor(PLC) to confirm move set check point 1 command reg = CP1_INPUT_CASE (1)
      poll
        regs ck pt 1 command register
      until command register = CP1_INPUT_ACKNOWLEDGED (0)

send msg to OPIF that the move is completed-input case(44)
   End

Check point 2 (Robot Staging)
    Begin
     while (forever)
       begin
         read regs check point 2 PLC command reg
         if command reg = CP2_LOAD_PRESENT (1)
           then
              read caseid registers to get upc number-upc_num update UPC scan in CIC display if not a bad scan (upc_num != XXXXXXXXXXXX)
            then
                Verify that the upc just scanned is the correct case matched = false
              for index = 1 to 10
                Begin
                  if (upc_num = next_output_case.upc_codesindex)
                    then
                      set matched = true
                      break for loop
                End
```

```
              if (matched = true)
                then
                   queue output case record (next_output_case)

-tell conveyor(PLC) to move the case into the (last_queue_used)
                   set PLC destination register = last_queue_used
                   set PLC command register = CP2_MOVE_CASE (4)
                   poll
                      regs PLC command register
                   until command register = CP2_MOVE_ACKNOWLEDGED (5)
                   set PLC command register = CP2_READY_FOR_CASE (0)

- if this is not the last case of the day then go
                     and get the next case if (check for last case (next_output_case) = FALSE)
                     then
                        get next output case (next_output_case)

else
                   set PLC command reg = CP2_HOLD_CASE (2)
                   (91) error msg -> <inv,incorrect case at check point 2> else
              set PLC command reg = CP2_HOLD_CASE (2)
              (92) error msg -> <inv,bad scan at check point 2>
      else
         sleep for 200 milliseconds End while forever
   End Check point 2A (Accept Case)
   Begin -tell conveyor(PLC) to move the case into the (last_queue_used)

set PLC destination register = last_queue_used set PLC command register = CP2_MOVE_CASE (4)
      poll
         PLC command register
      until command register = CP2_MOVE_ACKNOWLEDGED (5)
      set PLC command register = CP2_READY_FOR_CASE (0)

End

Check point 3 (robot_work_rec) - Robot Queue
   Begin
      case of robot_work_rec.op I_REMOVE_CASE:
            case of robot_work_rec.queue
              LEFT:
                 poll
                    PLC left command register
                 until reg <> CP3_REMOVE_CASE (1)

if reg = CP3_IDLE
                   begin
                      update CIC display to reflect empty case work area
```

```
        set left command register = CP3_LOAD_CASE (1)
      end
    else if reg = CP3_CASE_JAM (3)
    begin
      (110) error msg (inv) -> <robot LEFT queue jam>
      set conveyor status to OFFLINE
    end
    end if
  RIGHT:
    poll
      PLC right command register
    until reg <> CP3_REMOVE_CASE (1)

if reg = CP3_IDLE
    begin
      set right command register = CP3_LOAD_CASE (1)
    end
    else if reg = CP3_CASE_JAM (3)
    begin
      (111) error msg (inv) -><robot RIGHT queue jam>
      set conveyor status to OFFLINE
    end
    end if
  end case  - Note: falls through to next case I_LOAD_CASE:
  case of robot_work_rec.queue
    LEFT:
      poll
        LEFT queue
      until case is available to load update CIC display to reflect case arriving poll
        PLC left command register
      until reg <> CP3_LOAD_CASE (1)

if reg = CP3_IDLE
      begin

- do nothing, robot will ask for case contents later end
      else if reg = CP3_CASE_JAM (3)
      begin
        (110) error msg (inv) -> <robot LEFT queue jam>
        set conveyor status to OFFLINE
      end
      end if
    RIGHT:
      poll
        PLC right command register
      until reg <> CP3_LOAD_CASE (1)

if reg = CP3_IDLE
      begin
        (59) send msg to robot -> <RIGHT case loaded>
      end
      else if reg = CP3_CASE_JAM (3)
      begin
```

```
              (111) error msg (inv) -><robot RIGHT queue jam>
              set conveyor status to OFFLINE
            end
          end if end case I_GET_NEXT_CASE
        case of robot_work_rec.queue
          LEFT:
            wait until a case is in the LEFT queue
            if the case quantity > 0 then
              begin
                poll
                  LEFT case status register
                until case is loaded and locked
              end
              send reply msg to Robot I/F (46)
              update CIC display to reflect
                  active/inactive robot work areas
          RIGHT:
            wait until a case is in the RIGHT queue
            if the case quantity > 0 then
              begin
                poll
                  RIGHT case status register
                until case is loaded and locked
              end
              send reply msg to Robot I/F (46)
              update CIC display to reflect
                  active/inactive robot work areas
        end case
      end case End Check point 4 (Tote input)
  Begin
    While (forever)
      Begin
        read regs PLC command register for check point 4 if (command register = CP4_LOAD_PRESENT (1)

then
            read in tote barcode number update CIC display to show tote barcode read PLC toteid registers into tote_barcode if not a bad scan (tote_barcode != XXXXXXXX)

then
                - reset bad scan count -
                ck_pt_4_bad_scan_count = 0

-wait for a destination to open up
                do
                  -get a destination to store tote from the
                  -tote_storage_table
```

```
                destination = get next store location
                if destination = 0 - no location available
                  then
                    sleep for 5 seconds
                until we got a destination greater than 0 set destination reg = destination set command register = CP4_MOVE_TOTE (3)
                set tote storage status to TOTE_ARRIVING (1)
                set command register = CP4_READY_FOR_TOTE (0)

poll
                  command register
                until PLC acknowledges move request - CP4_READY_FOR_TOTE (0)

update tote table to reflect tote arriving else
                add 1 to ck_pt_4_bad_scan_count
                if (ck_pt_4_bad_scan_count > 2 )
                  then
                    (105) error msg -> <inv, three consecutive
                                    bad scans at check point 4>
                    set conveyor status to OFFLINE
                    - reset bad scan count -
                    ck_pt_4_bad_scan_count = 0
                  else
                    (93) error msg -> <bad scan at check point 4>
                    set command register = CP4_PASS_TOTE_THRU (3)
                  end
                set command register = CP4_READY_FOR_TOTE (0)

else
            sleep for 200 mill end while forever
End

Check point 5 (Storage Monitor)
  Begin while (forever)
      get current tote storage status
      check all tote spurs for jams
      if there is a jam
        begin
          (112) error message (inv) -> <tote jam near spur ID>
          set conveyor status to OFFLINE
        end

- check all tote spurs for change in status
      repeat for tote spur (T01 - T28)
        case previous status
          TOTE_SPUR_EMPTY
          TOTE_ARRIVING
            case current status
              TOTE_SPUR_OCCUPIED:
                update CIC display to reflect tote spur occupied
                send msg to robot: empty tote at position
                  - location = destination
```

```
                  tote_barcode (52)
            end case
          TOTE_OCCUPIED
            case current status
              TOTE_LEAVING
                update CIC display to reflect tote leaving
            end case
          TOTE_LEAVING
            case current status
              TOTE_SPUR_EMPTY
                update CIC display to reflect tote spur empty
            end case
          end case
        end repeat
        set previous status to current status
        sleep for 2 seconds
      end while End Check point 6 (Tote output)
  Begin
    While (forever)
      Begin
        read regs PLC command register for check point 6 if (command register = CP6_LOAD_PRESENT (1)

then
            read PLC toteid registers into tote_barcode update CIC display to show output scan barcode
            IPC40.tote_barcode = tote id entered
            send msg to process manager to Print Tote Packing Slip (40)
            if bad scan (tote_barcode == XXXXXXXX)
              then
                add 1 to ck_pt_6_bad_scan_count
                if (ck_pt_6_bad_scan_count > 2 )
                  then
                    (94) error msg -> <inv, three consecutive
                                       bad scans at check point 6>
                    - reset bad scan count -
                    ck_pt_6_bad_scan_count = 0
                  else
                    (95) error msg -> <bad scan at check point 6>
                end
              else  - good scan
                - reset bad scan count -
                ck_pt_6_bad_scan_count = 0
            end set PLC command register = CP6_READY_FOR_TOTE (0)
          else
            sleep 300 mill End while forever
    End Check Point 7 (Warning Sensor) (low cases sensor,
                                low totes sensor,
                                full output sensor)
```

```
begin
   light_state = 0         // assume light state (??)
   prevWarn array elements = NO_SENSOR_WARNING (0)

while (forever)
      begin
         isWarn = FALSE
         repeat for each sensor
          begin
            if sensor state = SENSOR_WARNING (1) then
             isWarn = TRUE if any sensors have changed then
              begin
                case of sensor
                  low cases:
                    errNum = I_WSL_ERR_LOW_CASES if active
                           = I_WSL_ERR_LOW_CASES_CLEAR if inactive
                  low input totes:
                    errNum = I_WSL_ERR_LOW_IN_TOTES if active
                           = I_WSL_ERR_LOW_IN_TOTES_CLEAR if inactive
                  full output totes:
                    errNum = I_WSL_ERR_FULL_OUT_TOTES if active
                           = I_WSL_ERR_FULL_OUT_TOTES_CLEAR if inactive
                end case
                send ---> error message to Error Handler
              end
            prevWarn array element = sensor state
          end read regs PLC command register for warning sensors
         if isWarn = TRUE then ... low cases sensor is off or
                              low totes sensor is off or
                              full output sensor is on)
            then
               light_state = 1                  /* turn light on   */
               send message to robot change light state (54)
            else
               if (light_state = 1 ... light is already on)
                 then
                    light_state = 0             /* turn light off  */
                 (54)send message to robot change light state
            end
         sleep 200 milliseconds
      end (while forever)
end Note: The PLC read and set register functions must be protected
      by semaphores so the different threads don't try to
      talk to the PLC all at the same time.
      Use - DosSemReqeust
```

Appendix E

```
While not done
    {
    /* NO TOTE PRESENT - ASSIGN ONE */
    if there is no tote in the workcell
        {
        lookup the most difficult brand
        assign a tote/order that uses this brand
        }
```

```
/* ITERATE BRANDS OF OLDEST TOTE */
  lookup the oldest tote in the workcell
  iterate the brands needed for this order
  from most difficult to easiest
      {
      determine the casesize of this brand
      count the bottles of this brand that can be
         assigned to the oldest tote (Note 1)
      if count >= casesize
          {
          we can place a case
          break out of brands loop
          }
      if count == 0 continue with next brand /* TRY TO USE EXISTING TOTES */
      iterate the other assigned totes oldest to newest
          {
          add to count the number of bottles of this brand that
             can be assigned to the tote
          if count >= casesize
              {
              we can place a case
              break out of brands loop
              }
          }

/* TRY TO USE NEW TOTES     */
      if there is room for additional totes
      and the bottles required for this brand in the oldest
      tote's order can all be placed in the oldest tote
          {
          iterate through orders that are not associated with
          totes in order of highest use of this brand to lowest use
              {
              while there is room and we have fewer than five
              pending order-totes (Note 2)
                  {
                  add to count the number of bottles of this brand that
                     can be assigned to the pending order-tote
                  if count >= casesize
                      {
                      we can place a case
                      break out of new order loop
                      }
                  }
              } close loop - try new orders
              if we can place a case using these new orders-totes
                  {
                  assign the new orders-totes to the workcell
                  break out of brand loop
                  }
          } close if statement - try new orders
      } close loop iterate by brand
  if we can place a case (by any means)
      {
      place the case (Note 3)
      dismiss completed totes
      }
  else if failed to place any case
      remove the oldest tote
  }
} close loop while not done
```

Notes from the above process flow.

Appendix F

```
Static Memory data status_rec    stat

Main program
   Begin initialization()

if (system status != Pending) OR (planner status != Completed)
       then
         wait for status to change to Pending (wait flag) semaphore open side information file for reading
     while (not eof)
     Begin
      read outlet number, bill of lading, and side
      (82) update_customer_side (outlet, bill_of_lading, side)
     End

- change system status from Pending to Ready
     (75) update_status (status_rec)
     send broadcast msg-status record updated (42)

End program initialization
 Begin
  initialize IPCOM communications
  (71) get_status (stat)
 End Case of IPCOM Msg B(42) status record updated
        Begin
          update internal memory copy with new status if (system status = Pending) AND (planner status = Completed)
            then
              clear wait flag S(45) Stop process
        Begin
          terminate program
        End
```

Appendix G

Robot Application

```
    initialize IPCOM communications

Robot sends following IPCOM messages
```

```
- Get next case for input side (L or R)
- First time always ask for the Right side
    (46) Get next robot case                    SW  Robot i/f---> conv i/f
                                                R   conv i/f ---> Robot i/f
        {
          int              side  (0=rigth 1=left)
          output_case_rec  robots_next_case
        }

- get system status record information
    (47) get status record                      SW  Robot -----> Procmgr
        {                                       R   Procmgr----> Robot
          status_rec  status
        }

- When changing robot status
    (41) Change Robot State                     S   OPIF -----> ROBOT I/F
                                                S   ROBOT I/f -----> PROC MGR
        {
          int    state   /* 0=offline, 1=online */
        }

- When you need the conveyor i/f to release a tote
    (50) Remove tote                            S   Robot ----> CONV i/f {
          int       location (1 to 28)
        }

- When you have completed and released a tote
    (51) tote complete                          S   Robot ----> Proc Mgr {
          long            tote_seq_num
          char            tote_barcode10+1
          int             last_tote_flag = TRUE   - last tote of the
                                                    day
                                           FALSE  - not last tote of
                                                    the day comp_tote_bom_rec comp_tote_bom6 comp_tote_bom_rec
            {
              long  case_seq_num
              int   qty_packed =  qty pack from this case and put into
                                  this tote
            }

}

Robot receives the following IPCOM messages

- anytime the system status record changes you get this message
    (42) status record updated                  B   OPIF ------> everybody
        {
          status_rec  status
        }

- The conv i/f responds to your request with the same message
```

```
        (46) Get next robot case                         SW  Robot i/f—> conv i/f
                                                         R   conv i/f —> Robot i/f {
               int              side   (0=rigth 1=left)
               output_case_rec  robots_next_case
             }

— Conv i/f will tell you when a position has been filled with an
     empty tote
        (52) Empty Tote at Position                      S   Conv i/f —> Robot {
               char tote_barcode10+1
               int location (1 to 28)
             }

— The operator interface can tell you to change your state
        (41) Change Robot State                          S   OPIF ——> ROBOT I/F
                                                         S   ROBOT I/f ——> PROC MGR
             {
                int    state   /* 0=offline, 1=online */
             }

— the operator interface can tell you to shut down
        (45) Stop process                                B   OPIF ——> All processes
             {
               n/a
             }

— This is the response to your request for status information
        (47) get status record                           SW  Robot ——> Procmgr
             {                                           R   Procmgr——> Robot
               status_rec  status
             }

Application
Structures

/*---------------------------------------------------------------------*/
/*                                                                     */
/*                    GLOBAL DEFINITIONS                               */
/*                                                                     */
/*---------------------------------------------------------------------*/
#define TRUE  1
#define LEFT  0
#define RIGHT 1

/*---------------------------------------------------------------------*/
/*                                                                     */
/*                    STRUCTURE DECLARATIONS                           */
/*                                                                     */
/*---------------------------------------------------------------------*/
typedef struct          /* holds the X,Y and Z components of any robot points */
  {
    float           x_c;              /* X coordinate of pt in spce*/
    float           y_c;              /* Y coordinate of pt in spce*/
    float           z_c;              /* Z coordinate of pt in spce*/
  }
point;

typedef struct          /* holds row/col offset info on the current work CASE */
  {
```

```
    float           pocket_x;       /* cntr to cntr pockt distance - X axis */
    float           pocket_y;       /* cntr to cntr pockt distance - Y axis */
    float           pocket_z;       /* cntr to cntr pockt distance - Z = 0! */
    float           initial_x;      /* offest from taught pt to center tool */
    float           initial_y;      /* over 1st column in X, match tools 1-4*/
    float           initial_z;      /* up with col pockets 1-4 in Y. The Z */
    }                               /* comp accounts for teach tool length. */
offset;

typedef struct         /* holds information about EACH tote PLACEMENT     */
  {
    int             num;            /* Spur number of place tote */
    int             qty;            /* Number of bottles to plce */
    unsigned int    tool_mask;      /* which TOOLS to use 4 place*/
    unsigned int    fill_pckt;      /* which POCKETS receive btls*/
    point           coords;         /* robot coords for place     */
  }
spur_info;

typedef struct         /* holds PLACEMENT information for EACH case PICKUP */
  {
    int             num_placements; /* how MANY plcmnts are req'd*/
    spur_info       spur_data[2];   /* info about the placements */
  }
pickup;

typedef struct         /* Holds information on CONTENTS of each tote pocket */
  {
    char            brand[12+1];    /* brand UPC code for PrcMgr */
    int             qty_placed;     /* number of brand in tote    */
  }
pocket_info;

typedef struct         /* Holds info about each TOTE in the robot envelope */
  {
    int             spur_num;       /* 0-27 for this design       */
    int             status;         /* 0=no tote,1=ready,2=in use*/
    long            seq_num;        /* Planner generated seq #    */
    unsigned int    fill_string;    /* use HEX to determine empty*/
    pocket_info     contents[6];    /* record brand placed,qty    */
  }
tote;

typedef struct         /* SUB struct of OUTPUT_CASE_REC received from CIC  */
  {
    long            tote_seq_num;   /* dest. tote sequence numbr */
    int             tote_qty;       /* # bottles to place in tote*/
    int             total_tote_qty; /* TOTAL # bottles in full t */
    int             eject_flag;     /* 1=eject when done, 0=keep */
  }
case_bom_rec;

typedef struct         /* Handed down by CIC for EACH case received by robot*/
  {
    long            case_seq_num;   /* 1,2,3,4,5,6,7,8,.......... */
    int             last_case_flag; /* 1=last case, 0=n/a         */
    char            brand_code[12+1]; /* WSL brand code number    */
    char            brand_descr[17+1]; /* Brand description verbage */
    char            upc_codes[10][12+1]; /* all possible UPC codes */
    int             case_qty;       /* number of bottles in case */
    double          case_width;     /* brand case WIDTH (inches) */
    double          case_depth;     /* brand case DEPTH (inches) */
```

```
    double          case_hght;              /* brand case HIGHT (inches) */
    int             rows;                   /* # rows (along DEPTH dim)  */
    int             cols;                   /* # cols (alont WIDTH dim)  */
    case_bom_rec    case_bom[6];            /* tote_seq_num, qty, eject  */
  }
output_case_rec;

typedef struct         /* structure for holding system initialization values */
  {
    int             loop_start;     /* start value for pick/place loop */
    int             loop_stop;      /* stop  value for pick/place loop */
    int             loop_index;     /* index value for pick/place loop */
    unsigned int    pick_sensors;   /* hex bitmap of sensors with btls */
    int             shift[3];       /* # pkts robot must shift to align*/
  }
case_pick;

typedef struct         /* holds ALL INFO concerning the CURRENT CASE in use! */
  {
    int             side;           /* CURRENT case pick SIDE (0 or 1) */
    int             crnt_pk_idx;    /* CURRENT column of pick case     */
    int             crnt_pl_idx;    /* CURRENT placement # of 2 (0,1)  */
    case_pick       pick;           /* CURRENT case PICK information   */
    output_case_rec work_case;      /* CURRENT case ORDER information  */
  }
btl_case;

Global Constants

/* These numbers would PROBABLY be best handled as a data file read in by the */
/* application on startup since they are subject to change after teaching,    */
/* crash repair etc.                                                          */ unsigned int  bottle_map[12]={0x0f9f, 0x0f9f, 0x0f0f, 0x0f0f, 0x0f09, 0x0f09, 0x00f0
, 0x00f0, 0x0090, 0x0090, 0x0000, 0x0000 };
case_pick     case_pick_arry[12]={{2,2,1,0x0020,{ 0,-1, 0} },
                                  {2,2,1,0x0060,{ 0,-1, 0} },
                                  {2,2,1,0x0070,{ 0, 0, 0} },
                                  {2,2,1,0x00f0,{ 0, 0, 0} },
                                  {2,3,1,0x00f2,{ 0, 0,-1} },
                                  {2,3,1,0x00f6,{ 0, 0,-1} },
                                  {1,3,2,0x0f07,{ 0, 0, 0} },
                                  {1,3,2,0x0f0f,{ 0, 0, 0} },
                                  {1,3,1,0x0f2f,{ 0,-1, 0} },
                                  {1,3,1,0x0f6f,{ 0,-1, 0} },
                                  {1,3,1,0x0f7f,{ 0, 0, 0} },
                                  {1,3,1,0x0fff,{ 0, 0, 0} }};
float    min_grip_space = 2.70;             /* minimum gripper sep dist.  */
float    grip_counts_inch = 100;            /* stepper motor counts eparte*/
float    teach_tote_height = 12.5;          /* ACTUAL hght of teach tote  */
float    teach_case_height = 10.0;          /* ACTUAL hght of teach case  */
float    app_z_hght = 5.0;                  /* all pick/places at same Z  */
float    tool_extend_time_spec = 1.0;       /* ALLOWABLE time for each    */
float    tool_retract_time_spec = 1.0;      /* gripper tool to ext/retrct*/
point    tote_tp[28] = { ...... };          /* all 28 tote teach points   */
point    case_tp[2]  = { ...... };          /* teach points for 2 cases   */
point    rbt_cts_inch =  { 1.00,1.00,1.00};/* each rbt axis may be difrnt*/
point    safe_location = { 0.00,0.00,0.00};/* safe place in rbt envelope */
offset   tote_offsets= {........};          /* pocket and initial offsets */
point    tool_offsets= {2.0,0.0,-5.0};      /* offsets in X,Y & Z to the  */
                                            /* CENTER of tool from the    */
                                            /* tool teaching fixture mt.  */
```

```
int          tote_use_preference[28]=
    {20,21,6,7,19,22,5,8,18,23,4,9,17,24,3,10,16,25,2,11,15 ,26,1,12,27,0,15};
int          next_close_tote[28][28]=          /* use to select 2nd place tot*/
    {{1,2,15,16,3,17,18,4,19,5,20,6,7,8,21,9,22,10,23,11,24,12,25,13,26,14,27},
     {0,2,3,16,15,17,4,18,19,5,20,6,7,8,21,9,22,10,23,11,24,12,25,13,26,14,27},
     {1,3,0,4,17,16,18,5,15,19,20,6,7,8,21,9,22,10,23,11,24,12,25,13,26,14,27},
     {2,4,1,5,18,17,19,6,0,20,16,15,7,8,9,21,22,10,23,11,24,12,25,13,26,14,27},
     {3,5,2,6,19,18,20,1,17,7,0,16,8,15,21,9,22,10,23,11,24,12,25,13,26,14,27},
     {4,6,3,20,7,19,2,8,18,1,17,21,16,0,9,22,15,10,23,11,24,12,25,13,26,14,27},
     {5,7,4,8,20,3,19,21,18,9,2,22,17,10,1,23,16,11,1,24,15,12,25,13,26,14,27},
     {8,6,9,21,5,10,22,20,4,11,23,19,3,24,12,18,2,25,13,17,1,26,14,16,27,1,15},
     {7,9,10,21,6,22,11,23,5,24,12,20,4,25,13,19,3,26,14,18,2,27,17,1,16,0,15},
     {8,10,7,11,22,21,23,12,24,6,25,13,26,5,14,20,4,27,19,3,18,2,17,1,16,0,15},
     {9,11,8,12,23,22,24,7,13,25,21,14,26,27,6,5,20,4,19,3,18,2,17,1,16,0,15},
     {10,12,9,13,24,23,25,14,8,26,22,27,21,7,6,5,20,4,19,3,18,2,17,1,16,0,15},
     {11,13,10,14,25,24,26,9,27,23,22,8,21,7,6,5,20,4,19,3,18,2,17,1,16,0,15},
     {12,14,11,26,25,27,10,24,23,9,22,8,21,7,6,5,20,4,19,3,18,2,17,1,16,0,15},
     {13,12,27,26,11,25,24,10,23,9,22,8,21,7,6,5,20,4,19,3,18,2,17,1,16,0,15},
     {16,17,0,1,18,2,3,19,4,20,5,6,7,21,8,22,9,23,10,24,11,25,12,26,13,27,14},
     {15,17,18,1,0,2,19,3,20,4,5,6,7,21,8,22,9,23,10,24,11,25,12,26,13,27,14},
     {16,18,15,19,2,1,3,20,4,0,5,6,7,21,8,22,9,23,10,24,11,25,12,26,13,27,14},
     {17,19,16,20,3,2,4,15,1,5,6,0,7,21,8,22,9,23,10,24,11,25,12,26,13,27,14},
     {18,20,17,4,3,5,16,2,6,15,1,0,7,21,8,22,9,23,10,24,11,25,12,26,13,27,14},
     {19,18,5,4,6,17,3,16,2,7,21,15,1,0,8,22,9,23,10,24,11,25,12,26,13,27,14},
     {22,23,8,7,9,10,24,6,11,25,20,12,26,19,5,13,27,28,18,4,17,3,16,2,15,1,0},
     {21,23,24,9,8,10,25,11,7,26,12,20,6,27,13,14,19,5,18,4,17,3,16,2,15,1,0},
     {22,24,21,25,10,9,11,26,12,8,27,13,7,14,20,6,19,5,18,4,17,3,16,2,15,1,0},
     {23,25,22,26,11,10,12,27,13,21,9,14,8,7,20,6,19,5,18,4,17,3,16,2,15,1,0},
     {24,26,23,27,12,11,13,22,10,14,21,9,8,7,20,6,19,5,18,4,17,3,16,2,15,1,0},
     {25,27,24,13,12,14,23,11,22,10,21,9,8,7,20,6,19,5,18,4,17,3,16,2,15,1,0},
     {26,25,14,13,24,12,23,11,22,10,21,9,8,7,20,6,19,5,18,4,17,3,16,2,15,1,0}};
```

/*---------------------------------------------------------------------------*/
/*                                                                           */
/*                    GLOBAL VARIABLE DECLARATIONS                           */
/*                                                                           */
/*---------------------------------------------------------------------------*/

Global Variables

```
int             max_totes=28;         /* maximum number of tote spurs in system */ struct tote     tote_info[28];        /* holds cross ref for tote seq/tote spur */
struct btl_case case_pick_info;       /* holds info about case bottle locations */
struct offset   cont_offsets;         /* Pocket CtoC in X and Y ([1][2]), case  */
                                      /* height ([3]), & the INITIAL case taught*/
                                      /* pt offset in X Y and Z                 */
struct pickup   case_place_info[3];   /* # & locations of pickup destinations   */
```

Macros

```
/* The SIDE variable is either ZERO (for left case) or ONE (for rght case) */
/* The SWAP_SIDE macro simply TOGGLES this variable state between 0 and 1  */
#define swap_side() side=(-side)+1;

/* SET_OFFSET_DIRECTION() sets the case offset DIRECTION for picking out of */
/* the left (0) or right (1) case. Because the TAUGHT points for each       */
/* case are NOT in the same corner (ie the left case point is in the upper  */
/* LEFT corner, the right case is in the upper RIGHT corner), the index     */
/* DIRECTION needs to be (+) for left case and (-) for the right case. This */
/* macro just uses the SIDE variable to determine the direction required.   */
#define set_offset_direction() sign=(1-(2*side))
```

```
/* The COUNTS macro simply converts inch dimensions to counts on an axis   */
/* by axis basis                                                            */
#define counts(value,axis) (long)(value*axis_counts_per_in[axis])

Main Routine

/* The Application Configuration and Initialization code will read in all   */
/* global data and structure definitions and initialize them with EITHER    */
/* new values on STARTUP or Fast Table stored values on RESTART. For better */
/* recovery possibilities, all application state info is stored to disk (ie */
/* FAST TABLE). Rest of the application is in a WHILE loop that tests the   */
/* CASE_PICK_INFO.WORK_CASE.LAST_CASE_FLAG - just keeps asking for a new case*/
/* until there are no more!                                                 */
move_to (safe_location)                  /* move max Z, middle envelope  */
test_gripper_functions()                 /* to test the gripper sensors  */
/*                    done with the config/init items                      */ while (last_case == 0)
     (system status=ACTIVE or TERMINATION PENDING and last_case==0)
    {                                         /* Only run if ACTIVE, TERM-Dry*/
    get_next_case();                          /* get info to START run       */
    set_loop_parms();                         /* init CASE_PLACE_INFO stuf   */
    clear case_place_info                     /* clear the work in prog var  */
    set shadow loop variable to current value /* update disk copy of variable*/
    assign_seq_to_totes()                     /* asgn Seq#s to tote spur #s  */
    find_opt_pattern()                        /* assign the order for fills  */
    is this the last case, if so, set last_case=1  /* the way we finish day! */
    if case_qty = 0 then                      /* On a PHANTOM case,          */
      {                                       /* no case physically          */
      update tote structure elements to show 0 placed  /* enters robot area, */
      exit_flagged_totes(output_case_rec)     /* so no picks and no          */
      swap_side()                             /* places - BUT, may           */
      }                                       /* need to EXIT TOTES          */
    else
      {                                       /* NORMAL case handling        */
      cont_offset=calculate_case_offsets(output_case_rec) /* det. grip space */
                                              /* initial and pckt ofsts      */
      set_offset_direction(side)              /* case 0=(+), case 1=(-)      */
      i=case_pick_info.loop_start             /* set STARTING VALUE of i     */
      while i<case_pick_info.pick_stop        /* check ENDING VALUE of i     */
          and (Status=ACTIVE or TERMINATION PENDING) /* and system STATUS    */
        {
        set_gripper_spread(brand)        /* space grippers to case pockets   */
        neutralize_grippers()            /* ready grippers for pickup move   */
        case_pick_info.crnt_pk_idx=i;    /* update memory loop storge        */
        RBT_CaseTblMgr(TB_UPDATE);       /* update FAST TABLE shadow!        */
        calc_placement_points(i);        /* determine placement coords       */
        move_to(i);                      /* move over PICKUP location        */
        wait_for_robot()                 /* wait for move to FINISH!         */
        grab_bottles(case_pick_info,i)   /* extend grip,grab,verify,up       */
        set_gripper_spread(tote)         /* adjust grip to TOTE space        */
        for (j=0,j<case_place_info.num_placements,j++)
          {
          move_to (placement_point[i])   /* build with QTY & which_tools     */
          wait_for_robot()               /* wait for robot to FINISH move    */
          qty=place_bottles(which_tools) /* extend only tools required       */
          } update_quantities_placed(qty)    /* reflect ACTUAL qtys placd        */
        i=i+case_pick_info.loop_index    /* increment WHILE loop cntr        */
        }                                /* end of WHILE loop                */
```

```
        exit_flagged_totes(output_case_rec)      /* exit all totes indicated */
        swap_side();                             /* change pick_case side    */
        last_case=get_next_case();               /* get a new case to work on */
        set_loop_parms();                        /* init CASE_PLACE_INFO stuf */
        }                                        /* end ELSE                 */
    }
    if status==TERMINATION PENDING               /* on TERMINATE, exit all   */
       then exit_totes_on_terminate()            /* the partial totes remain. */
    send_message(41,0)                           /* tell CIC, PrcMgr = offline*/
    shutdown_power()                             /* drop robot motor power   */

Functions neutralize_grippers()                            /* DO ALL 4 grippers!!!     */
    for i=1 to 4
        turn OFF gripper close solenoid          /* stop CLOSING the gripper */
        turn ON  gripper open  solenoid          /* start OPENing the gripper */
        wait for gripper to open                 /*                          */
        verify gripper is open                   /* Assure all the way open  */
        turn OFF gripper open  solenoid          /* allow gripper to 'float' */ move_to(where)
    {
    if power_off then operator_intervention(power_off)/* tell Op. to power up */
    if (robot_status==0)                         /* don't move if PAUSED     */
        {
        send_message(41,0)                       /* tell PrcMgr in PAUSE     */
        wait for resume                          /* check IPCOM messages     */
        send_message(41,1)                       /* tell PrcMgr in RUN       */
        }
    send_message_to_robot(Counts X, Counts Y, Counts Z)  /* set encoder cnts */
    send_message_to_robot(execute Absolute move)         /* start move       */
    } wait_for_robot()                                 /* Poll the robot axis cont- */
    {                                            /* roller until it says that */
    while robot is still moving dossleep         /* the move has completed.   */
    } test_gripper_functions()
    {
    turn OFF extend A for all tools
    turn OFF extend B for all tools              /* verify that sensors work */
       all tool up   sensors should be on        /* correctly on tool retract */
       all extend A  sensors should be off
    turn ON  extend A for all tools              /* verify PARTIAL extension */
    turn OFF extend B for all tools              /* sensors                  */
       all tool up   sensors should be off
       all extend A  sensors should be on
    turn ON  extend A for all tools              /* verify FULL tool extend  */
    turn ON  extend B for all tools              /* sensors work correctly   */
       all tool up   sensors should be off
       all tool down sensors should be on
    turn ON all gripper close solenoids          /* verify gripper sensors   */
       wait for grippers to close
       all gripper sensors should be on
    turn OFF all gripper close solenoids
    turn ON  all gripper open  solenoids
       all gripper sensors should go off then back on
    collapse tool spread to minimum              /* verify tool spread sensrs */
       spread home   sensor should be on
    expand   tool spread to maximum
```

```
       spread sensor should go off then on again
       for i=1 to 4                               /* verify that each tool    */
         start timer                              /* retracts in correct TIME */
         retract tool[i] (A and B cylinders)
         stop timer on tool[i] up sensor
         is tool retract time in specs?
       for i=1 to 4
         start timer                              /* verify that each tool    */
         extend tool[i] (A and B cylinders)       /* extends in correct TIME  */
         stop timer on tool[i] down sensor
         is tool extend time in specs?
       for i=1 to 4
         turn extend  A[i] ON
         turn retract B[i] ON                     /* leave A extended         */
       neutralize_grippers()                      /* ready grippers for pickup */
     } request_next_carton(side)                              /* this routine requests a  */
       send_message(46,side) via ipcom, wait 4 reply /* carton from the CIC - it */
                                                           /* must be done AHEAD of the */
                                                           /* needed time because it    */
                                                           /* actually initiates the    */
                                                           /* move of a case into the   */
                                                           /* unload position, when CIC */
                                                           /* comes back with info, it  */
                                                           /* IMPLIES the case is ready!*/ request_new_tote()                                     /* This routine requests a  */
       send_message(xx,side) via ipcom, wait 4 reply /* tote location from CIC.  */
                                                           /* The CIC returns the next */
                                                           /* CLOSEST tote spur location*/
                                                           /* that has an empty tote in */
                                                           /* place and ready for load. */

/* SET_LOOP_PARMS takes the quantity of bottles in the case from the global  */
     /* CASE_PICK_INFO.WORK_CASE.CASE_QTY, and sets up the global CASE_PICK_INFO   */
     /* variable with the proper values using the CASE_PICK_DATA initialized info */
     set_loop_parms()                                   /* set up loop variables    */
     {
       int   qty=case_pick_info.work_case.case_qty;   /* grab the QTY in the case*/ case_pick_info.pick = case_pick_arry[qty-1];
       case_pick_info.crnt_pk_idx = case_pick_info.pick.loop_start;
       case_pick_info.crnt_pl_idx = 0;
       RBT_CaseTblMgr(TB_UPDATE);                     /* update FAST TABLE shadow! */
     } /* end of set_loop_parms() */

/* CALC_PLACEMENT_POINTS() takes as input WHICH of the 3 PICK actions to use */
     /* and then accesses the global structures TOTE_INFO and CASE_PICK_INFO to   */
     /* calculate the PLACEMENT POINTS for each of the possible 2 placements for  */
     /* the current case PICKUP.                                                  */
     calc_placement_points(i)
       {
       int        wt[2];                        /* holds the tote spur #s    */
       int        j,t,p,col,row;                /* for/while loop counters   */
       unsigned int pkt_map;                    /* map of current tote pkts  */
       unsigned int tmp_pkt_map;                /* 'WORKING' pocket map      */
       unsigned int qty_mask=0x0000;            /* number of bottles in place*/
       unsigned int bottles_in_tool= 0x000f;    /* select Ith layout         */
       unsigned int loop_mask[3];               /* blank all but loop i      */
       unsigned int t_mask=0x0000;              /* temp mask 4 pocket locatn */
```

```
int     non_four_open_column=-1;        /* column with 2-3 empty pkts*/
int     st_col=0;                       /* variable while loop start */
int     en_col=0;                       /* variable while loop test  */
int     final_col=0;                    /* tote column for placement */
int     final_row=0;                    /* place starting row in tote*/
int     done=0;                         /* flag=1 when loc'n found   */
unsigned int temp_tote;

/* Loop Masks are used to separate out single 4 bit sections of the hex */
/* info by PICKUP index number (first, second or third pickup from case) */
loop_mask[0]=0x0f00; loop_mask[1]=0x00f0; loop_mask[2]=0x000f;

bottles_in_tool=                        /* set up which tools to use */
        (case_pick_info.pick.pick_sensors & loop_mask[i])>>((2-i)*4);
switch (case_place_info[i].num_placements)
    {                                   /*                           */
    case 0
    case 1:                             /* only ONE placment to make */
    t=0; done=0;                        /* set the tote array index # */
    wt[t]=case_place_info[i].spur_data[0].num; /* get 1st tote spur number */
    pkt_map=tote_info[wt[t]].fill_string; /* get the tote pocket map */
    for (col=0;col<3;col++)             /* look through the three    */
        {                               /* columns to find one to fill*/
        tmp_pkt_map=((pkt_map & loop_mask[col]) >> (2-col)*4 ) ;
        if (tmp_pkt_map==0)             /* When one is found, calc   */
            {                           /* the col, row offset needed */
            done=1;
            case_place_info[i].spur_data[t].fill_pckt=
                        (case_pick_info.pick.pick_sensors & loop_mask[i]);
            case_place_info[i].spur_data[t].tool_mask=bottles_in_tool;
            case_place_info[i].spur_data[t].coords.x_c =
                    tote_tp[wt[t]].x_c
                  + (tote_offsets.initial_x * rbt_cts_inch.x_c)
                  + (col * tote_offsets.pocket_x * rbt_cts_inch.x_c);
            case_place_info[i].spur_data[t].coords.y_c =
                    tote_tp[wt[t]].y_c
                  - (tote_offsets.initial_y * rbt_cts_inch.y_c);
            case_place_info[i].spur_data[t].coords.z_c =
                    tote_tp[wt[t]].z_c
                  - (tote_offsets.initial_z * rbt_cts_inch.z_c);
        if (temp_tote==0x0fff)
            {
            fprintf(outptr,"  ------- TOTE %2d IS FULL ---------Ln",wt[t]+1);
            } /* endif */
        break;                          /* end loop once match found */
        } /* end if */
    } /* endfor */
    if (done == 0)                      /* FAILED to find place spot */
        {
        fprintf(outptr,"LnLnERROR - failed to find 4 bottle placement positionLnL
n");
        printf("LnLnERROR - failed to find 4 bottle placement positionLnLn");
        printf("Press any to continue...Ln");
        ch=getche();
        }
    break;
    case 2:                             /* may be 1 or 2 (1-2) place */
    fprintf(outptr,"      One or Two (1-2) Bottle PlacementsLn");
    wt[0]=case_place_info[i].spur_data[0].num; /* get 1st tote spur num*/
    wt[1]=case_place_info[i].spur_data[1].num; /* get 2nd tote spur num*/
    for (t=0;t<2;t++)
        {
```

```
qty_mask=mask_info[t][case_place_info[i].spur_data[t].qty-1];
done=0;                                 /* reset flag for each tote   */
if (t==0)                               /* set WHICH tools to extend  */
  case_place_info[i].spur_data[t].tool_mask=
    (bottles_in_tool & (qty_mask>>abs(case_pick_info.pick.shift[i])));
else                                    /* in order to place in tote  */
  case_place_info[i].spur_data[t].tool_mask=
    (bottles_in_tool & (qty_mask<<abs(case_pick_info.pick.shift[i])));
if (wt[t] != -1)                        /* second place may be DUMMY  */
  {
  pkt_map=tote_info[wt[t]].fill_string;      /* tote pkt map*/
  non_four_open_column=-1;
  for (col=0;col<3;col++)               /* find offset */
    {
    if ( (((pkt_map & loop_mask[col]) >> (2-col)*4 ) > 1)
         (((pkt_map & loop_mask[col]) >> (2-col)*4 ) < 0x000f) )
       {
       non_four_open_column=col;
       } /* end if (pkt_map) */
    } /* end for (col) */
  if (non_four_open_column<0)
    {                               /* NO partials, look at all   */
    st_col=0; en_col=3;             /* the columns of the tote    */
    }                               /* and use the FIRST match!   */
  else
    {                               /* There IS a partial, use IT*/
    st_col=non_four_open_column; en_col=st_col+1; /* as the start*/
    } /* end if (non_four_open_column) column, then search rows! */
  col=st_col;                       /* initialize the col loop    */
  while ((col < en_col) (done == 0))
    {
    tmp_pkt_map=((pkt_map & loop_mask[col]) >> (2-col)*4 );
    t_mask=0x000c;
    row=0;                          /* initialize the row loop    */
    while ((row < 3) (done == 0))/* 3 because 0001 not valid! */
      {
      if ((tmp_pkt_map & t_mask)==0) /* SAVE candidate col    */
         {                           /* & row for point calc  */
         final_col=col;  final_row=row;
         done=1;
         } /* end if (tmp_pkt_map & */
      t_mask >>= 1;
      row++;
      } /* endwhile --- row  */
    col++;
    } /* endwhile --- col  */
  if (done == 0)                    /* FAILED to find place spot */
    {
    fprintf(outptr,"LnLnERROR - no 2 bottle place position found!!!LnLn"
);
    printf("LnLnERROR - no 2 bottle place position found!!!LnLn");
    printf("Press any to continue...Ln");
    ch=getche();
    }
  case_place_info[i].spur_data[t].coords.x_c =
      tote_tp[wt[t]].x_c
    + (tote_offsets.initial_x * rbt_cts_inch.x_c)
    + (final_col * tote_offsets.pocket_x * rbt_cts_inch.x_c);
  case_place_info[i].spur_data[t].coords.y_c =
      tote_tp[wt[t]].y_c
    - (tote_offsets.initial_y * rbt_cts_inch.y_c)
    + ((final_row+case_pick_info.pick.shift[col])*tote_offsets.pocket_y
```

```
                * rbt_cts_inch.y_c);
            case_place_info[i].spur_data[t].coords.z_c =
                tote_tp[wt[t]].z_c
                - (tote_offsets.initial_z * rbt_cts_inch.z_c);
            t_mask=((0x000c >> final_row) << ((2-final_col)*4));
            }
          else
            {
              fprintf(outptr,"Zero placement quantity...clearing parameters\n");
              case_place_info[i].spur_data[t].coords.x_c =0.0;
              case_place_info[i].spur_data[t].coords.y_c =0.0;
              case_place_info[i].spur_data[t].coords.z_c =0.0;
            } /* endif (wt[t]<>0)*/
        } /* endfor (t) */
      break;
      } /* end switch*/
   } /* end calc_placement_points() */

/* ASSIGN_SEQ_TO_TOTES() uses the global structures TOTE_INFO[] and         */
/* CASE_PLACE_INFO.WORK_CASE.CASE_BOM[] and TOTE_INFO. It takes one of the  */
/* .CASE_BOM[] elements at a time and then searches all TOTE_INFO[i].SEQ_NUM */
/* to see if the sequence number is already assigned. If it is, then nothing*/
/* is done, but if it ISN'T, then the routine uses the TOTE_USE_PREFERENCE  */
/* variable to search all the tote spurs for the next CLOSEST AVAILABLE spur */
/* to the case unload stations.                                             */
assign_seq_to_totes()
 {
  int        i=0;
  int        j=0;
  int        found=0;
  long       seq=0;

for (i=0;i<6;i++)
    {
    found=0;
    if (case_pick_info.work_case.case_bom[i].tote_seq_num > 0)
      {
      seq=case_pick_info.work_case.case_bom[i].tote_seq_num;
      for (j=0;j<max_totes;j++)
        {
        if (tote_info[j].seq_num == seq)      /* if there is a match, set  */
          found=1;                            /* found=1 to indicate that. */
        } /* endfor */
      if (found == 0)                         /* NO MATCH was found, so the */
        {                                     /* sequence number is NEW!    */
        for (j=0;j<max_totes;j++)             /* Go through all spur locns  */
          {                                   /* in tote_use_preference seq */
          if (tote_info[tote_use_preference[j]].status==1) /* to find next*/
            {                                 /* closest AVAILABLE tote    */
            tote_info[tote_use_preference[j]].status=2;   /* mark IN USE */
            tote_info[tote_use_preference[j]].seq_num=seq;/* assign seq# */
            tote_info[tote_use_preference[j]].fill_string =
              bottle_map[case_pick_info.work_case.case_bom[i].total_tote_qty-1];
            RBT_ToteTblMgr(TB_UPDATE,tote_use_preference[j]);
            j=max_totes;                      /* stop looping once 1 found */
            } /* end if (tote_info[) */
          } /* end for (j<max_totes) */
        } /* end if (found==0) */
      } /* endif */
    } /* end for (i<6) */
  } /* end of ASSIGN_SEQ_TO_TOTES() */
```

```
set_gripper_spread(container)                    /* this function interfaces  */
{                                                /* with the stepper motor    */
  double   container_dim;                        /* controller to accomplish  */
  double   cell_spacing;                         /* gripper spread according  */
  double   delta_offset;                         /* to the continer being     */
  double   step_counts;                          /* accessed (passed parm)    */
  if container=="brand"
      cell_spacing=cont_offsets.pocket_y         /* assign Y axis pocket space*/
    else                                         /* of the BRAND case         */
      cell_spacing=tote_offsets.pocket_y         /* assign Y axis pocket space*/
    endfor                                       /* of the TOTE               */
  delta_offset=(cell_spacing-min_grip_space)/2   /* size of delta move needed */
  step_counts=grip_counts_inch*delta_offset      /* convert inches to counts  */
  home the gripper - verify home sensed
  command gripper stepper motor to move required steps
} update_wip(info)
{
  for (i=0,i<aggsize(info),i++)                  /* for each tote, update the */
    {                                            /* info on qty placed, and   */
    set qty_placed = qty_placed + info[i].qty    /* get it ejected if need be */
    if (info[i].exit == 1)
      then send_message(50,sequence_id_info.spur_num) /*get CIC to exit tote*/
           send_message(51,sequence_id_info)          /*give PrcMgr all info*/
    }
}

/* The FIND_OPT_PATTERN function builds an output_case_rec STRUCTURE called  */
/* TEMP_REC and modifies it as the placement sequence is generated from the  */
/* current case_pick_info.work_case structure.  Two other functions (FIND_   */
/* SINGLE and FIND_DOUBLE are called from here, and THEY update the GLOBAL   */
/* variable CASE_PLACE_INFO with the number of placements per pickup         */
/* Anytime a column has only 2 bottles in it, MAKE IT A (2) 2 bottle placement
/* type with the second tote # of -1 - this allows a more generic cal_point
/* algorithm.
find_opt_pattern()
{
  int              i=0;
  int              j=0;
  unsigned int     work_bits=case_pick_info.pick.pick_sensors;
  unsigned int     bit_mask=0x0800;
  int              column_pick_qty[3];  /* number of bottles in EACH column  */
  output_case_rec  temp_rec;            /* use to track place. assign. progres*/
  output_case_rec  *ptr;                /* POINTER to temp_rec - pass to fns */ temp_rec=case_pick_info.work_case;             /* get working copy of info. */
  ptr =                                 /* assign temp_rec pointer   */ for (i=0;i<3;i++)                              /* count up the NUMBER of    */
    {                                            /* bottles PICKED this time  */
    column_pick_qty[i]=0;                        /* START with zero and add   */
    for (j=0;j<4;j++)                            /* one every time the bit    */
      {                                          /* mask has a 1 in it. Max   */
      if (work_bits & bit_mask) column_pick_qty[i]++;
      bit_mask >>=1;                             /* will be 4, min will be 0  */
      } /* end for (j<4) */
    } /* end for (i<3) */ for (j=0;j<3;j++)                              /* work through all 3 pickup */
    {                                            /* operations and find dest- */
```

```
                    switch (column_pick_qty[j])              /* ination totes for the #    */
                    {                                        /* of bottles in each column.*/
                      case 0:
                        case_place_info[j].num_placements=0;/* on ZERO pickup bottles      */
                        case_place_info[j].spur_data[0].num=-1; /* clear out all the info*/
                        case_place_info[j].spur_data[0].qty=0;  /* for each of the two    */
                        case_place_info[j].spur_data[0].tool_mask=0x0000; /* possible     */
                        case_place_info[j].spur_data[1].num=-1; /* placement actions.    */
                        case_place_info[j].spur_data[1].qty=0;
                        case_place_info[j].spur_data[1].tool_mask=0x0000; /* possible     */
                        break;                               /* place.spur_data[x].num=-1 */
                      case 1
                      case 2
                      case 3
                      case 4
                    } /* endswitch */
                } /* end for (j) */
} /* end of find_opt_pattern() */

/* FIND_SINGLE() takes the qty, PICK index # and a pointer to the TEMP_REC   */
/* structure as input. These are used to locate a valid placement to a tote,*/
/* update the correct case_place_info array structure and temp_rec info resp.*/
/* Set case_pick_info[i].num_placements = 2 to ease the calc_placement_point */
/* algorithm somewhat.                                                       */
find_single(qty,which_pick,tr_ptr)                   /* 1 placement req'd         */
  output_case_rec *tr_ptr;
{
  int                    j=0;                        /* loop index variable       */
  int                    t=0;                        /* tote # locate loop varibl */
  int                    done=0;                     /* indicate when match found */
  int                    which_tote=0;               /* tote spur # to place in   */ fprintf(outptr,"Looking for SINGLE....qty=%d, which_pick=%d\n",qty,which_pick);
  fprintf(outptr,"STARTING case_bom[i].tote_qty: ");
  for (j=0;j<6;j++)
    {
      fprintf(outptr,"[%d]=%2d, ",j,tr_ptr->case_bom[j].tote_qty);
    } /* end for (j<6) */
  fprintf(outptr,"\n");
  j=0;
  while ((j<6) (done==0))                            /* look through all 6 possibl*/
    {                                                /* placements to see if an   */
      if (tr_ptr->case_bom[j].tote_qty>=qty)         /* EXACT match can be found  */
        {                                            /* for qty currently in tool */
          done=1;                                    /* indicate match was found  */
          tr_ptr->case_bom[j].tote_qty-=qty;         /* decrement the temp struct */
          case_place_info[which_pick].num_placements=2; /* by qty of match        */
          for (t=0;t<max_totes;t++)                  /* look through all tote_info*/
            {                                        /* to xref the seq# to spur# */
              if (tote_info[t].seq_num==tr_ptr->case_bom[j].tote_seq_num)
                {
                  which_tote=t;                      /* remember which tote match */
                  t=max_totes;                       /* exit the loop!            */
                } /* end if (tote_info) */
            } /* endfor */                           /* store the tote for plcmnt */
          case_place_info[which_pick].spur_data[0].num=which_tote; /* & qty -    */
          case_place_info[which_pick].spur_data[0].qty=qty;        /* zero 2nd*/
          case_place_info[which_pick].spur_data[1].num=-1;         /* tote    */
          case_place_info[which_pick].spur_data[1].qty=0;          /* info.   */
          t=0;                                       /* reset the loop variable   */
        } /* end if (tr_ptr) */
      j++;                                           /* increment loop counter    */
```

```c
      } /* end while (j) */ if (done !=1)
     {
        fprintf(outptr,"\nERROR! No match was found for SINGLE placement!\n"); /* error */
        printf("\nERROR! No match was found for SINGLE placement!\n"); /* error */
        printf("QTY = %d,  Which_pick=%d\n",qty,which_pick);
        printf("Press any to continue...\n");
        ch=getche();
     }
   fprintf(outptr,"ENDING   case_bom[i].tote_qty: ");
   for (j=0;j<6;j++)
      {
        fprintf(outptr,"[%d]=%2d, ",j,tr_ptr->case_bom[j].tote_qty);
      } /* end for (j<6) */
   fprintf(outptr,"\n");
  } /* end of find_single() */

/* FIND_DOUBLE() takes the qty, PICK index # and a pointer to the TEMP_REC   */
/* structure as input.  These are used to locate a valid placement to up to  */
/* two different totes. The algorithm FIRST trys to place
Output is updates to the case_place_info array struct*/
/* and teh TEMP_REC structure                                                */
find_double(qty,which_pick,tr_ptr)              /* 2 placements MAY be req'd */
 output_case_rec  *tr_ptr;                      /* declare POINTER type      */
 {
  int            i=0;
  int            j=0;                   /* loop index variable       */
  int            s=0;                   /* spur search loop variable */
  int            t=0;                   /* tote # locate loop varibl */
  int            done=0;                /* indicate when match found */
  int            which_tote=0;          /* tote spur # to place in   */
  int            fst_tote=0;            /* SPUR for first of 2 place */
  int            sec_tote=0;            /* SPUR for secnd of 2 place */
  int            r_qty=qty;             /* track number left to place*/ fprintf(outptr,"Looking for DOUBLE....qty=%d, which_pick=%d\n",qty,which_pick);
   fprintf(outptr,"STARTING case_bom[i].tote_qty: ");
   for (j=0;j<6;j++)
      {
        fprintf(outptr,"[%d]=%2d, ",j,tr_ptr->case_bom[j].tote_qty);
      } /* end for (j<6) */
   fprintf(outptr,"\n");
   j=0;
   while ((j<6) (done==0))              /* look through all 6 possibl*/
      {                                 /* and try to find EXACT full*/
        if (tr_ptr->case_bom[j].tote_qty>=qty)   /* match for all bottles!    */
          {
            done=1;                              /* indicate match was found  */
            tr_ptr->case_bom[j].tote_qty-=qty;   /* decrement the temp struct */
            case_place_info[which_pick].num_placements=1;  /* by qty being placd */
            for (t=0;t<max_totes;t++)            /* look through all tote_info*/
               {                                 /* to xref the seq# to spur# */
                 if (tote_info[t].seq_num==tr_ptr->case_bom[j].tote_seq_num)
                   {
                     which_tote=t;               /* remember which tote match */
                     t=max_totes;                /* exit the loop!            */
                   } /* end if (tote_info) */
               } /* endfor */                    /* store the tote for plcmnt */
            case_place_info[which_pick].spur_data[0].num=which_tote;  /* & qty - */
            case_place_info[which_pick].spur_data[0].qty=qty;         /* zero 2nd*/
```

```
              case_place_info[which_pick].spur_data[1].num=-1;           /* tote    */
              case_place_info[which_pick].spur_data[1].qty=0;            /* info.   */
              t=0;                                            /* reset the loop variable  */
            } /* end if (tr_ptr) */
          j++;
        } /* end while (j) */
      if (done==0)                                     /* NO exact match, so must    */
        {                                              /* break into TWO placements!*/
         for (i=0;i<2;i++)                             /* loop through the 2 places */
           {
             done=0;                                   /* reset the match flag...   */
             if (i == 0)                               /* look through all remaining */
               {                                       /* placements for !=0 qty    */
                 j=0;                                  /* reset the loop counter    */
                 while ((j<6) (done==0))               /* look through all possibl*/
                   {                                   /* and take any left that    */
                     if (tr_ptr->case_bom[j].tote_qty>0)  /* have non zero qtys left.*/
                       {
                         done=1;                       /* indicate match was found*/
                         r_qty-=tr_ptr->case_bom[j].tote_qty; /* keep up w/# placed! */
                         case_place_info[which_pick].spur_data[0].qty=
                                                   tr_ptr->case_bom[j].tote_qty;
                         tr_ptr->case_bom[j].tote_qty=0;  /* zero out count for loc'n*/
                         case_place_info[which_pick].num_placements=2; /* set # plcmnt*/ which_tote=xref_seq_to_spur(tr_ptr->case_bom[j].tote_seq_num);
                         case_place_info[which_pick].spur_data[0].num=which_tote;
                       } /* end if (tr_ptr) */
                     j++;
                   } /* end while (j) */
               }
             else                                      /* on SECOND tote, get next  */
               {                                       /* CLOSEST TOTE to the FIRST */
                 fst_tote = case_place_info[which_pick].spur_data[0].num; /* find  */
                 sec_tote = get_2nd_close_tote(fst_tote,tr_ptr,r_qty);    /* nxt & */
                 case_place_info[which_pick].spur_data[1].num = sec_tote; /* assign*/
                 case_place_info[which_pick].spur_data[1].qty = r_qty;    /* info  */
                 for (j=0;j<6;j++)                     /* update the temp_rec with  */
                   {
                     if (tote_info[sec_tote].seq_num==tr_ptr->case_bom[j].tote_seq_num)
                       {
                         tr_ptr->case_bom[j].tote_qty-=r_qty;
                         r_qty=0;
                       } /* end if (tote_info) */
                   } /* end for (j<6) */
                 if (r_qty != 0) fprintf(outptr,"FAILED to find second place spur!\n");
               } /* end if (i==1) */
           } /* end for (i<2) */
        } /* endif */
      RBT_CaseTblMgr(TB_UPDATE);
      fprintf(outptr,"ENDING   case_bom[i].tote_qty: ");
      for (j=0;j<6;j++)
        {
          fprintf(outptr,"[%d]=%2d, ",j,tr_ptr->case_bom[j].tote_qty);
        } /* end for (j<6) */
      fprintf(outptr,"\n");
    } /* end of find_double() */

/* GET_2ND_CLOSE_TOTE() uses as input the spur number of the first tote being*/
/* placed to, a pointer to the TEMP_REC structure and the number of bottles  */
/* to place in this tote. It uses the global array NEXT_CLOSE_TOTE to find   */
/* a tote close to the first one that also requires bottles from the current */
```

```c
/* case.                                                                    */
get_2nd_close_tote(st,tr_ptr,qty)
 output_case_rec   *tr_ptr;                    /* declare POINTER type      */
 {
   int         s=0;                            /* index into xref array     */
   int         j=0;                            /* index into .case_bom array*/
   int         t=0;                            /* index into seq#/spur xref */
   int         spur[6];                        /* holds all applicable spurs*/
   int         sseq[6];                        /* holds all applicable seq#s*/
   int         a_spur;                         /* temp storage in xref op   */
   int         spur_wt[6];                     /* used to WEIGHT match spur */
/* Three loops are used to determine the next closest tote to the passed   */
/* in one. The first loop builds elements of SUPR[6] which are the SPUR #s */
/* that are assigned to the case_pick_info.work_case.case_bom sequence #s  */
/* The second loop looks at each element in spur[6] and then finds it in   */
/* the next_close_tote array.  The starting tote # (st) is the index elem  */
/* into the array, then the loop searches the 28 spur #s at that index     */
/* to find the one in spur[i] - the index value is used as the WEIGHT for  */
/* that tote - this weight is stored in SPUR_WT[6].                        */
/* Finally, the spur_wt[6] is searched sequentially for the LOWEST value - */
/* this is the CLOSEST TOTE to the starting tote.                          */ for (j=0;j<6;j++)                           /* INITIALIZE the spur and   */
     {                                         /* sseq and spur_wt arrays!  */
       spur[j]    = 99;                        /* Use 99s so that EMPTY     */
       sseq[j]    = 99;                        /* elements are easy to tell */
       spur_wt[j] = 99;                        /* apart from assigned ones! */
     } /* end for (j) */
/*   NOW, build the SEQUENCE # / SPUR # XREF ARRAY ---------------SPUR[] */
   fprintf(outptr,"Seq#/Spur Xref: ");
   for (j=0;j<6;j++)                           /* first, find ALL spur xrefs*/
     {                                         /* that are still have non 0 */
       if (tr_ptr->case_bom[j].tote_qty>0)     /* fill qtys remaining...    */
         {
           spur[j]=xref_seq_to_spur(tr_ptr->case_bom[j].tote_seq_num);
         } /* end if (tr_ptr) */
       fprintf(outptr,"[%d]=%3d, ",j,spur[j]+1);
     } /* endfor */
   fprintf(outptr,"Ln");
/* NEXT, ASSIGN A WEIGHT TO EACH MATCHING SPUR LOCATION ---------SPUR_WT[] */
   s=0;j=0;t=0;                                /* reset loop variables      */
   fprintf(outptr,"Spur Wt:        ");
   for (j=0;j<6;j++)                           /* now, give a WEIGHT to each*/
     {                                         /* APPLICABLE spur in order  */
       if ((spur[j] < 99) (tr_ptr->case_bom[j].tote_qty >= qty))
         {                                     /* to determine which of the */
           for (s=0;s<max_totes;s++)           /* multiple matches to use!  */
             {
               if (spur[j] == next_close_tote[st][s])
                 {
                   if (((qty % 2 == 1) (tr_ptr->case_bom[j].tote_qty % 2 == 1)) || (qty =
= tr_ptr->case_bom[j].tote_qty))
                     {                         /* on PERFECT match or ODD # */
                       spur_wt[j]=0;           /* pick AND place qtys, give */
                     }                         /* PREFERENTIAL weight!      */
                   else
                     {                         /*          OTHERWISE......  */
                       spur_wt[j]=s+1;         /* let "1" be MINIMUM value  */
                     } /* endif */             /* exit the loop on match    */
                   s=max_totes;
                 } /* end if (spur[j]) */
             } /* end for (s<max_totes) */
```

```
        } /* end if (spur[j]) */
     fprintf(outptr,"[%d]=%3d, ",j,spur_wt[j]);
     } /* end for (j) */
  fprintf(outptr,"Ln");
  /* FINALLY, FIND THE CLOSEST SPUR BY LOOKING RO THE LOWEST WEIGHT ELEMENT */
  a_spur=0;                                    /* start index at first spur */
  for (j=0;j<6;j++)                            /* search all elements of the*/
    {                                          /* spur_wt array and take the*/
     if ((spur_wt[j] < 99) (spur_wt[j]<spur_wt[a_spur])) /* INDEX to elem */
        {                                      /* with SMALLEST value - use */
         a_spur=j;                             /* this INDEX into SPUR to   */
        } /* endif */                          /* get the SPUR # of the     */
     } /* end for (j) */                       /* closest spur to first plc */
  fprintf(outptr,"Place #1 was in spur %d, second place to be=%2dLn",st+1,spur[a_
spur]+1);
  return (spur[a_spur]);                       /* return the CLOSEST spur# */
  } /* end of GET_2ND_CLOSE_TOTE() */ calculate_case_offsets(output_case_rec)
   {                                           /* this function calculates  */
    cont_offset.pocket_x=                      /* the pocket X,Y & Z offsets*/
       output_case_record.case_width/          /* and the initial X,Y,Z ofst*/
          output_case_record.cols;             /* for the brand info passed.*/
    cont_offset.pocket_y=                      /* Alter the cont_offset     */
       output_case_record.case_depth/          /* variable for use in picks */
          output_case_record.rows;
    cont_offset.pocket_z=0;                    /* NO delta for pockets!     */
    cont_offset.initial_x=                     /* Initial X delta (offset)  */
       (cont_offsets.pocket_x*0.5)-(tool_offset[1]);
    cont_offset.initial_y=                     /* Initial Y delta           */
       (cont_offsets.pocket_y*(output_case_rec.rows/2))-tool_offset[2];
    cont_offset.initial_z=                     /* account for non parallel  */
       case_tp.z_c-teach_case_height-tool_offset[3]+app_z_height; /* robot XY */
    return (cont_offset);
    };                                         /* plane to plane of conveyor*/ place_bottles(which_tools)
   {
    int   qty_placed;                          /* holds # actually placed!  */
    for tools 1 to 4                           /* MAY need 4 THREADS for    */
       {                                       /* parallel actions!!        */
        if tool[i] is in which_tools
          {
           qty_placed=qty_placed+1;            /* increment # of placed btl */
           turn ON tool[i]_funnel solenoid     /* extend tool funnel        */
           turn ON tool[i] extend A solenoid   /* extend tool cylinder A    */
           turn ON tool[i] extend B solenoid   /* extend tool cylinder B    */
           wait for tool_extend_time_spec
           if tool[i] down sensor is ON then
              {
               qty_placed=qty_placed-1;
               operator_intervention(broke the bottle, bottle map)
              }
           turn OFF gripper[i] CLOSE solenoid
           turn ON  gripper[i] OPEN  solenoid
           turn OFF tool[i] funnel solenoid
           turn OFF tool[i] extend B solenoid and start timer
           wait for tool[i] extend A sensor to make
           if timeout then
              operator_intervention(gripper stuck, bottle map)
          } /* end of if */
```

```
} /* end of for */                      /* RETURN the number actually placed */
return (qty_placed);
} exit_flagged_totes(output_case_rec)      /* pass in output_case_rec         */
{
int i=0;                                 /* outer loop counter              */
int j=0;                                 /* inner loop counter              */
int exit_spur;                           /* spur number of tote 2 exit*/
for (i=0,i<6,i++)                        /* for EACH of the 6 possible*/
  {                                      /* destination TOTES, check  */
  if output_case_rec.case_bom_rec[i].eject_flag==1 then
    {                                    /* the EXIT flag. If it is   */
    for (j=0,j<28,j++)                   /* set, XFEF the seq# to the */
       if tote_info[j].seq_num=output_case_rec.case_bom_rec[j].tote_seq_num
         then exit_spur=j;                /* spur#, then tell the CIC  */
    send_message(50,exit_spur)           /* to EXIT that SPUR number. */
    send_message(51,tote_info[exit_spur]) /* send PrcMgr ALL tote info */
    reset tote_info[exit_spur]           /* reset xref array[i] empty */
    }
  }
}
```

Appendix H

Query Manager (QM)

Queries
    (30) WPLR – Warehouse Pick List Report (case table sorted by locator code)
    (31) SKUPR– SKU Pick Report (case table sorted by case sequence)

Panel
    (32) BRAND– panel add to Brand Table
    (33) BRAND– panel update Brand Table Utility Panels
    STATUS Table Update Appendix I

SQL.TXT

Cursor Declarations

```
input_cases
    select *
      into case_rec
      from cases table
      where case_seq_num > last_input_case
      order by case_seq_num output_cases
    select case_seq_num, brand_code, cases table.brand_descr,
           upc_code1,......,upc_code10,
           case_qty, case_width, case_depth, case_hght,
           case_rows, case_cols,
           tote_seq_num1,.....,tote_seq_num6,
           tote_qty1,.....,tote_qty6,
           total_tote_qty1,.....,total_tote_qty6,
           eject_flag1,.....,eject_flag6
      from cases table, brand table
      where cases table.brand_code = brand table.brand_code
      and   case_seq_num > last_output_case
```

```
unproc_totes
    select customer_tote_num, outlet,
           case_seq_num1, planned_qty1, actual_qty1,
           case_seq_num2, planned_qty2, actual_qty2,
           case_seq_num3, planned_qty3, actual_qty3,
           case_seq_num4, planned_qty4, actual_qty4,
           case_seq_num5, planned_qty5, actual_qty5,
           case_seq_num6, planned_qty6, actual_qty6
      from totes table
      where tote_barcode is NULL
      order by tote_seq_num select ship_date, bill_of_lading, total_num_of_totes
      into packing_slip_rec
      from customer table
      where outlet = packing_slip_rec.outlet For index = 1 to 6
    Begin
     select brand_code, brand_descr, proof,
            locator_code, warehouse_side
       into packing_slip_rec.pack_infoindex
       from cases table
       where case_seq_num =
               packing_slip_rec.pack_infoindex.case_seq_num End (for 1 to 6)

End

(70) get_packing_slip (packing_slip_rec)

Begin select customer_tote_num, outlet,
           case_seq_num1, planned_qty1, actual_qty1,
           case_seq_num2, planned_qty2, actual_qty2,
           case_seq_num3, planned_qty3, actual_qty3,
           case_seq_num4, planned_qty4, actual_qty4,
           case_seq_num5, planned_qty5, actual_qty5,
           case_seq_num6, planned_qty6, actual_qty6
      into packing_slip_rec
      from totes table
      where tote_barcode = packing_slip_rec.tote_barcode select ship_date, bill_of_lading, total_num_of_totes
      into packing_slip_rec
      from customer table
      where outlet = packing_slip_rec.outlet For index = 1 to 6
    Begin
     select brand_code, brand_descr, proof,
            locator_code, warehouse_side
       into packing_slip_rec.pack_infoindex
       from cases table
       where case_seq_num =
               packing_slip_rec.pack_infoindex.case_seq_num End (for 1 to 6)

End
```

```
(71)  get_status (status_rec)
          Begin
              select *
                 into status_rec
                 from status table
          End

(72)  open_input_cases(unsigned int : last_input_case)
          Begin
              open input_cases cursor
          End

(73)  fetch_next_input_case (case_rec)
          Begin
              fetch input_cases
                into case_rec
          End

(74)  close_input_cases()
          Begin
              close input_cases cursor
          End

(75)  update_status (status_rec)
          Begin
              update status table
                 set status = status_rec
          End

(76)  get_last_case_seq_num (unsigned int : seq_num)
          Begin
              select max (case_seq_num)
                 into seq_num
                 from cases table
          End

(77)  update_case_qtys (case_rec)
          Begin
              update cases table
              set case_qty  = case_rec.case_qty,
                  tote_qty1 = case_rec.case_bom1.tote_qty,
                  tote_qty2 = case_rec.case_bom2.tote_qty,
                  tote_qty3 = case_rec.case_bom3.tote_qty,
                  tote_qty4 = case_rec.case_bom4.tote_qty,
                  tote_qty5 = case_rec.case_bom5.tote_qty,
                  tote_qty6 = case_rec.case_bom6.tote_qty
                  total_tote_qty1 = case_rec.case_bom1.total_tote_qty,
                  total_tote_qty2 = case_rec.case_bom2.total_tote_qty,
                  total_tote_qty3 = case_rec.case_bom3.total_tote_qty,
                  total_tote_qty4 = case_rec.case_bom4.total_tote_qty,
                  total_tote_qty5 = case_rec.case_bom5.total_tote_qty,
                  total_tote_qty6 = case_rec.case_bom6.total_tote_qty
              where case_seq_num = case_rec.case_seq_num End
```

```
(78) open_output_cases(unsigned int
        Begin
            open output_cases cursor
        End

(79) fetch_next_output_case (output_case_rec)
        Begin
            fetch output_cases
            into output_case_rec
        End

(80) close_output_cases()
        Begin
            close output_cases cursor
        End

(81) update_tote_rec (IPC51)
        Begin
            tote_rec    temp_tote_rec select *
            temp_tote_rec
            from totes table
            where tote_seq_num = IPC51.tote_seq_num /* assign the barcode to this tote */
            temp_tote_rec.tote_barcode = IPC51.barcode /* match case sequence numbers with those in the IPC51 */
            /* structure and update actual quantities in the       */
            /* temp tote record                                    */
            for out_ndx = 1 to 6
             Begin
              for in_ndx = 1 to 6
               Begin /* does the temp tote record case sequence number */
                /* match the case sequence number in the IPC51 structure */ if (temp_tote_rec.tote_bomin_ndx.case_seq_num =
                    IPC51.comp_tote_bomout_ndx.case_seq_num)
                  then
                    /* set the actual quantity for this case sequence */
                    /* number to the quantity in the IPC51 structure  */
                    /* for this case                                  */ temp_tote_rec.tote_bomin_ndx.actual_qty =
                    IPC51.comp_tote_bomout_ndx.qty_packed break for loop
               End
             End /* when all of the actual quantities have been updated, */
            /* update the totes table for this tote record          */ update totes table
            set tote_barcode = temp_tote_rec.barcode,
                actual_qty1 = temp_tote_rec.tote_bom1.actual_qty,
```

```
                actual_qty2 = temp_tote_rec.tote_bom2.actual_qty,
                actual_qty3 = temp_tote_rec.tote_bom3.actual_qty,
                actual_qty4 = temp_tote_rec.tote_bom4.actual_qty,
                actual_qty5 = temp_tote_rec.tote_bom5.actual_qty,
                actual_qty6 = temp_tote_rec.tote_bom6.actual_qty
            where tote_seq_num = temp_tote_rec.tote_seq_num End

(82) update_customer_side(char *outlet, char new_side)
        Begin
            update customer table
            set side = new_side
            where outlet = outlet End

(83) open_unproc_totes()
        Begin
            open output_cases cursor
        End

(84) fetch_unproc_totes (packing_slip_rec)
        Begin
            fetch unproc_totes
            into packing_slip_rec select ship_date, bill_of_lading, total_num_of_totes
              into packing_slip_rec
              from customer table
              where outlet = packing_slip_rec.outlet For index = 1 to 6
              Begin
                select brand_code, brand_descr, proof,
                    locator_code, warehouse_side
                  into packing_slip_rec.pack_infoindex
                  from cases table
                  where case_seq_num =
                        packing_slip_rec.pack_infoindex.case_seq_num End (for 1 to 6)
        End

(85) close_unproc_totes()
        Begin
            close unproc_totes cursor
        End .width=page talign=right
   align='left center center left left'
   scale='.95'  split=yes
   hp='2 1 1 1 1'  headhi=3
   rules=both frame=box.
System Transaction and Data Flow
```

These are the system transactions and data flow for the WSLCB Project.

T#
Type
Source
Destination
Description
Data 1
menu selection
operator
OPIF
view error log
n/a 2
menu selection
operator
OPIF
add records to BRAND table
n/a 3
menu selection
operator
OPIF
update BRAND table
n/a 4
menu selection
operator
OPIF
print warehouse pick list report (case table sorted by locator code)
n/a 5
menu selection
operator
OPIF
print case pick report (case table sorted by case sequence)
n/a 6
menu selection
operator
OPIF
print tote packing slip
n/a 7
menu selection
operator
OPIF
print unprocessed totes packing slips
n/a 8
menu selection
operator
OPIF
start system
n/a

```
9
menu selection
operator
OPIF
shutdown system
n/a 10
menu selection
operator
OPIF
terminate production
n/a 11
menu selection
operator
OPIF
re_start system
n/a 12
menu selection
operator
OPIF
pause robot
n/a 13
menu selection
operator
OPIF
resume robot
n/a 14
menu selection
operator
OPIF
pause conveyor
n/a 15
menu selection
operator
OPIF
resume conveyor
n/a 16
menu selection
operator
OPIF
enter/wand case UPC label
n/a 17
menu selection
operator
OPIF
enter partial qty fort a case
n/a
```

18
menu selection
operator
OPIF
identify case as missing
n/a 19
menu selection
operator
OPIF
help
n/a 20
menu selection
operator
OPIF
exit system
n/a 30
QM query
OPIF
QM
run QM query to print warehouse pick list report
query="WPLR"

31
QM query
OPIF
QM
run QM query to print case pick report
query="casePR"

32
QM panel
OPIF
QM
run QM panel BRAND to add reports to the brand table
panel="BRAND"

33
QM panel
OPIF
QM
run QM panel BRAND to update records in the brand table
panel="BRAND"

40
IPCOM Send
OPIF or CONV i/f
PROCMGR
print tote packing slip
tote_barcode (if 'xxxx', bad scan at tote output;
if 'oooo', bad scan at tote input)

41
IPCOM send
OPIF
ROBOT i/f
update robot state in status record 0=offline, 1=online
see page   for status record structure 41
IPCOM send
ROBOT i/f
PROCMGR
update robot state in status record 0=offline, 1=online
see page for status record structure 42
IPCOM broadcast
anybody
everybody
announce status record update
see page for status record structure 43
IPCOM send
OPIF
CONV i/f
update conveyor state in status record 0=offline, 1=online
see page for status record structure 44
IPCOM send
OPIF
CONV i/f
input case — release case into system
n/a
44
IPCOM send
CONV i/f
OPIF
input case — case released into system
n/a 45
IPCOM broadcast
OPIF
everybody
announce stop process
n/a 46
IPCOM sendwait
ROBOT i/f
CONV i/f
get next case case for robot
see page for output case record structure 46
IPCOM reply
CONV i/f
ROBOT i/f
get next case case for robot reply for next SKU for robot
see page for output case record structure 47
IPCOM sendwait
ROBOT i/f
PROCMGR
get status record
see page for status record structure 47
IPCOM reply
PROCMGR
ROBOT i/f
get status record - reply to robot i/f with status record
see page   for status record structure 48
IPCOM send
OPINV
CONV i/f
retry scan
check_point_number 49
IPCOM send
OPINV
CONV i/f
accept case
n/a 50
IPCOM send
ROBOT i/f
CONV i/f
remove tote
location 51
IPCOM send
ROBOT i/f
PROCMGR
tote complete
see page   for tote record update structure 52
IPCOM send
CONV i/f
ROBOT i/f
empty tote at specified position tote_barcode
location 53
IPCOM send
CONV i/f
ROBOT i/f
missing case at check point 2
n/a 54
IPCOM send
CONV i/f
ROBOT i/f
change light state
light_state 55
IPCOM send
OPINV ROBOT i/f
broken bottle
n/a 56
IPCOM send
OPINV
ROBOT i/f
missing bottle
n/a 57
IPCOM send
OPINV
ROBOT i/f
retry pick
n/a 58
IPCOM send
CONV i/f
ROBOT i/f
Remove case
n/a 59
IPCOM send
CONV i/f
PROCMGR
Print unprocessed tote packing slips
n/a 70
SQL func
n/a
SQL
get packing slip for a tote
see page
packing_slip_rec
see page for packing slip record structure 71
SQL func
n/a
SQL
get current status record
see page
status_rec
see page for status record structure 72
SQL func
na/
SQL
open input case cursor
see page
last_iput_case 73
SQL func

```
na/
SQL
fetch next case from the next input case record
see page
case_rec
see page  for case record structure 74
SQL func
n/a
SQL
close input case cursor
see page
n/a 75
SQL func
n/a
SQL
update status record
see page
status_rec
see page  for status record structure 76
SQL func
n/a
SQL
get last case sequence number for the days run
see page
seq_num 77
SQL func
n/a
SQL
update case quantities of a case record
see page
case_rec
see page  for case record structure 78
SQL func
n/a
SQL
open output cases cursor
see page
last_output_case 79
SQL func
n/a
SQL
fetch next output case from the output cases cursor
see page
output_case_num 80
SQL func
n/a
SLQ
close output cases cursor
```

```
see page
n/a

81
SQL func
n/a
SQL
update tote record
see page see page  for tote record update structure 82
SQL func
n/a
SQL
add the warehouse side to a customer record
see page outlet
side 83
SQL func
n/a
SQL
open the unprocessed totes cursor
see page
n/a 84
SQL func
n/a
SQL
fetch the next unprocessed tote's packing slip
see page
packing_slip_rec
see page  for packing slip record structure 85
SQL func
n/a
SQL
close the unprocessed totes cursor
see page
n/a 90
IPCOM send
CONV i/f
ERRHAND
error message
no case in holding state at checkpoint 2
n/a 91
IPCOM send
```

CONV i/f
ERRHAND
intervention
incorrect case at checkpoint 2 expecting brand
qty

105
IPCOM send
CONV i/f
ERRHAND
Low cases clear
n/a

106
IPCOM send
CONV i/f
ERRHAND
Low in totes
n/a

107
IPCOM send
CONV i/f
ERRHAND
Low in totes clear
n/a

108
IPCOM send
CONV i/f
ERRHAND
Full out totes
n/a

109
IPCOM send
CONV i/f
ERRHAND
Full out totes clear
n/a

110
IPCOM send
CONV i/f
ERRHAND
intervention Jam in left Robot queue
n/a

111
IPCOM send
CONV i/f
ERRHAND
intervention Jam in right Robot queue
n/a

112
Data Storage Requirements

The data necessary to process a day's run is stored in tables in the SQL database. The following is a detailed description of the tables needed to store and manipulate data for a day's run.

The "Ind" column of the tables shows a "K" for a column that is part of a primary key, a "!" for items that are not nullable, and "-" for items that can be null. The "K" items that make up a primary key are always non-nullable and are constrained to be unique.

Orders Table

The orders table is created by the system planner from the orders list transferred from the Host system. This file is basically a work file for the system planner.

```
align='left left center left left left left'
scale ='.75'split=yes.
```

Orders Table

Table used to store orders obtained from the Host system. This table is used by the system planner.

Column Name
Full Name
Ind
Data Type
Value Set
Description
Data Origin

Outlet
Outlet Number
!
Character (6)

The outlet number for the order
Host system order list

RSN_Number
RSN Number
!
Character (6)

WSLCB record sequence number for the order
Host system order list

Brand_Code
Brand Code
!
long

Brand code for this RSN
Host system order list

Brand_Descr
Brand Description

A possible UPC code for this brand
Host system order list

UPC_Code3
UPC Code Number 3
-
Character (12)

A possible UPC code for this brand
Host system order list

UPC_Code4
UPC Code Number 4
-
Character (12)

A possible UPC code for this brand
Host system order list

UPC_Code5
UPC Code Number 5
-
Character (12)

A possible UPC code for this brand
Host system order list

UPC_Code6
UPC Code Number 6
-
Character (12)

A possible UPC code for this brand
Host system order list

UPC_Code7
UPC Code Number 7
-
Character (12)

A possible UPC code for this brand
Host system order list

UPC_Code8
UPC Code Number 8
-
Character (12)

A possible UPC code for this brand
Host system order list

UPC_Code9
UPC Code Number 9
-
Character (12)

A possible UPC code for this brand
Host system order list

UPC_Code10
UPC Code Number 10
-
Character (12)

A possible UPC code for this brand
Host system order list

Status Table
The status table keeps the current status of the system (the entire
production line), the conveyor, and the robot. It also maintains flags that
indicate whether important activities have been performed.

```
      align='left left center left left left left'
      scale ='.75' split=yes.
```
Status Table
Table used to maintain the current status of the system. This table
is used by all of the processes in the system.

Column Name
Full Name
Ind
Data Type
Value Set
Description
Data Origin

Conveyor
Conveyor Status
!
Integer
0=offline 1=online
The current status of the conveyor offline
conveyor process is not communicating to the PLC
online
conveyor process is communicating with the PLC Conveyor Interface Robot
Robot Status
!
Integer
0=offline 1=online
The current status of the robot offline
The robot will not move because of an error or the operator has paused the
robot. If error — the operator, after fixing the error, selects resume to
bring the robot back on line
online
The robot is ready to do work Robot Application
  •
Planner
Planner Status
!
Integer
0=idle 1=working 2=completed
The current status of the system planner Idle
The system planner is awaiting the order list from the Host system for
the day's run.
working
The system planner is creating the production schedule for the day's run.

completed
The system planner has completed the production schedule for the day's run.

Robot Application

System
System Status
!
Integer
0=Idle 1=Active 2=Pending 3=Ready 4=Shutdown 5=Termination_ pending
The current status of the system Idle
The system has complete all orders. The system goes to idle once
the robot has sent out the last tote.
Active
The system is actively working on orders
Pending
The planner is currently planning out the day's orders
Ready The planner has completed and the line is ready to begin
Shutdown
The operator has selected the system shutdown option.
Shutting down the system
means that production stops immediately. Production continues when
the re-start option is selected.
Terminate Production
The operator has selected the terminate production menu option.
Terminating the system
means that the operator interface does not allow anymore cases to be
entered.

Modified by all processes

Side_Data_ Updated
Side Data Updated Flag
!
Integer
0=False 1=True
A flag to determine if the side data has been updated
False
The side data has not been updated because the data has not been
transferred from the Host system or the side data update utility has not
completed.
True
The side data has been updated.

Side Data Update process

Last_Case_Seq_ Num
Last Case Sequence Number
!
Integer

Indicates the last case for the day's run
System Planner, Operator Interface

Last_Case_Proc
Last Case Processed
!

Integer
0=False 1=True
Indicates whether the last case for the day's run has been processed True
The last case has been processed by the robot
False
The last case has not been processed yet — planner initializes System Planner, Conveyor Interface Last_Tote_Seq_ Num
Last Tote Sequence Number
!
Integer Indicates the last tote for the day's run
System Planner Brands Table
The data in the brands table is entered by a technician. This data is used by the robot application to determine what the case dimensions are for each brand.

align='left left center left left left left'
    scale ='.75' split=yes.
Brands Table
Table used to store specific information about particular brands and how they are packaged. It is used by the robot interface process.

Column Name
Full Name
Ind
Data Type
Value Set
Description
Data Origin

Brand_Code
Brand Code
K
long

Brand code for a product
Entered by operator

Brand_Descr
Brand Description
!
Character (17)

Character description of this brand
Entered by operator

Case_Width
Case Width
!
Decimal (5,2)

The width of the standard case for this brand
Entered by the operator

Case_Depth
Case Depth
!
Decimal (5,2)

The depth of the standard case for this brand
Entered by the operator

Case_Height
Case Height
!
Decimal (5,2)

The height of the standard case for this brand
Entered by the operator

Case_Rows
Case Rows
!
Integer
4
The number of cells along the long case dimension.  Always 4 for this
application
Entered by the operator Case_Cols
Case Cols
!
Integer
3
The number of cells along the short case dimension.  Always 3 for this
application
Entered by the operator Cases Table
The cases table is generated by the system planner.  It is used to
print the warehouse pick list, sequence cases into the Part-Case
Materials Handling system, and to direct the packing of totes.

talign=right
    align='left left center left left left left'
    scale ='.75' split=yes.
Cases Table
Table used to establish the order in which cases are processed.  This
table is generated by the system planner.

Column Name
Full Name
Ind
Data Type
Value Set
Description
Data Origin

Case_Seq_Num
Case Sequence Number
K
Integer

Indicates the order in which this case should be processed
System Planner

```
Brand_Code
Brand Code
!
long

Brand code for this case
System Planner

Brand_Descr
Brand Description
!
Character (17)

Character description of this brand
System Planner

Proof
Proof
!
Character (6)

The proof of this brand

System Planner

Locator_Code
Locator Code
!
Character (5)

The warehouse location from where this brand should be picked
System Planner

Repack_Loc_ Code
Repack Location Code
!
Character (5)

The repack location code where this brand should placed
System Planner

Quantity
Quantity
!
Integer

The quantity of this brand in this case
System Planner

UPC_Code1
UPC Code Number 1
!
Character (12)

A possible UPC code for this brand
System Planner

UPC_Code2
UPC Code Number 2
-
Character (12)
```

A possible UPC code for this brand
System Planner

UPC_Code3
UPC Code Number 3
-
Character (12)

A possible UPC code for this brand
System Planner

UPC_Code4
UPC Code Number 4
-
Character (12)

A possible UPC code for this brand
System Planner

UPC_Code5
UPC Code Number 5
-
Character (12)

A possible UPC code for this brand
System Planner

UPC_Code6
UPC Code Number 6
-
Character (12)

A possible UPC code for this brand
System Planner

UPC_Code7
UPC Code Number 7
-
Character (12)

A possible UPC code for this brand
System Planner

UPC_Code8
UPC Code Number 8
-
Character (12)

A possible UPC code for this brand
System Planner

UPC_Code9
UPC Code Number 9
-
Character (12)

A possible UPC code for this brand
System Planner

UPC_Code10
UPC Code Number 10
-
Character (12)

A possible UPC code for this brand
System Planner

Tote_Seq_Num1
Tote Sequence Number 1
!
Integer

Sequence number of tote to pack
System Planner

Tote_Qty1
Tote Quantity 1
!
Integer

Quantity of this brand to pack into tote 1
System Planner

Total_tote_qty1
Total Tote Quantity 1
!
Integer

Total quantity of bottles in tote 1
System Planner

Eject_Flag1
Eject Flag Number 1
!
Integer
0=no eject  1=eject
A flag to indicate if tote 1 should be ejected after it is packed
System Planner Tote_Seq_Num2
Tote Sequence Number 2
-
Integer Sequence number of tote to pack
System Planner Tote_Qty2
Tote Quantity 2
-
Integer Quantity of this brand to pack into tote 2
System Planner Total_tote_qty2
Total Tote Quantity 2
!
Integer Total quantity of bottles in tote 2
System Planner Eject_Flag2
Eject Flag Number 2
-
Integer 0=no eject 1=eject
A flag to indicate if tote 2 should be ejected after it is packed
System Planner Tote_Seq_Num3
Tote Sequence Number 3
-
Integer Sequence number of tote to pack
System Planner Tote_Qty3
Tote Quantity 3
-
Integer Quantity of this brand to pack into tote 3
System Planner Total_tote_qty3
Total Tote Quantity 3
!
Integer Total quantity of bottles in tote 3
System Planner Eject_Flag3
Eject Flag Number 3
-
Integer
0=no eject 1=eject
A flag to indicate if tote 3 should be ejected after it is packed
System Planner Tote_Seq_Num4
Tote Sequence Number 4
-
Integer Sequence number of tote to pack
System Planner Tote_Qty4
Tote Quantity 4
-
Integer Quantity of this brand to pack into tote 4
System Planner Total_tote_qty4
Total Tote Quantity 4
!
Integer Total quantity of bottles in tote 4
System Planner Eject_Flag4
Eject Flag Number 4
-

Integer
0=no eject  1=eject
A flag to indicate if tote 4 should be ejected after it is packed System Planner Tote_Seq_Num5
Tote Sequence Number 5
—
Integer Sequence number of tote to pack
System Planner Tote_Qty5
Tote Quantity 5
—
Integer Quantity of this brand to pack into tote 5
System Planner Total_tote_qty5
Total Tote Quantity 5
!
Integer Total quantity of bottles in tote 5
System Planner Eject_Flag5
Eject Flag Number 5
—
Integer
0=no eject  1=eject
A flag to indicate if tote 5 should be ejected after it is packed
System Planner Tote_Seq_Num6
Tote Sequence Number 6
—
Integer Sequence number of tote to pack
System Planner Tote_Qty6
Tote Quantity 6
—
Integer Quantity of this brand to pack into tote 6
System Planner Total_tote_qty6
Total Tote Quantity 6
!
Integer Total quantity of bottles in tote 6
System Planner

```
Eject_Flag6
Eject Flag Number 6

Integer
0=no eject  1=eject
A flag to indicate if tote 6 should be ejected after it is packed
System Planner Totes Table
The totes table is created by the system planner.  It is used to generate
the tote list that is transferred to the Host system, verify the contents of
each tote after packing, and print the packing list for each tote.

align='left left center left left left left'
        scale ='.75' split=yes.
Totes Table
Table used to establish the order in which totes are processed.  This
table is generated by the system planner.

Column Name
Full Name
Ind
Data Type
Value Set
Description
Data Origin

Tote_Seq_ Num
Tote Sequence Number
K
Integer

Sequence number of the tote
System Planner

Customer_Tote_ Num
Customer Tote Sequence Number
!
Integer

Sequence number of the tote within the customer's order
System Planner

Outlet
Outlet Number
!
Character (6)

The outlet number for the order
System Planner

Tote_Barcode
Tote Barcode Number
!
Character (10)

The unique barcode number assigned to a tote
Robot Application

Case_Seq_ Num1
Case Sequence Number 1
```

!
Integer

Indicates the sequence number of a case used to pack tote 1
System Planner

RSN_Number1
RSN Number 1
!
Character (6)

WSLCB record sequence number for the order
System Planner

Planned_Qty1
Planned Quantity 1
!
Integer

Quantity of this brand planned to pack into tote 1
System Planner

Actual_Qty1
Actual Quantity 1
!
Integer

Quantity of this brand actually packed into tote 1
Robot Application

Case_Seq_Num2
Case Sequence Number 2
—
Integer

Indicates the sequence number of a case used to pack tote 2
System Planner

RSN_Number2
RSN Number 2
—
Character (6)

WSLCB record sequence number for the order
System Planner

Planned_Qty2
Planned Quantity 2
—
Integer

Quantity of this brand planned to pack into tote 2
System Planner

Actual_Qty2
Actual Quantity 2
—
Integer

Quantity of this brand actually packed into tote 2
Robot Application

Case_Seq_Num3

Case Sequence Number 3

Integer

Indicates the sequence number of a case used to pack tote 3
System Planner

RSN_Number3
RSN Number 3

Character (6)

WSLCB record sequence number for the order
System Planner

Planned_Qty3
Planned Quantity 3

Integer

Quantity of this brand planned to pack into tote 3
System Planner

Actual_Qty3
Actual Quantity 3

Integer

Quantity of this brand actually packed into tote 3
Robot Application

Case_Seq_Num4
Case Sequence Number 4

Integer

Indicates the sequence number of a case used to pack tote 4
System Planner

RSN_Number4
RSN Number 4

Character (6)

WSLCB record sequence number for the order
System Planner

Planned_Qty4
Planned Quantity 4

Integer

Quantity of this brand planned to pack into tote 4
System Planner

Actual_Qty4
Actual Quantity 4

Integer

Quantity of this brand actually packed into tote 4
Robot Application

Case_Seq_Num5
Case Sequence Number 5

—

Integer

Indicates the sequence number of a case used to pack tote 5
System Planner

RSN_Number5
RSN Number 5

—

Character (6)

WSLCB record sequence number for the order
System Planner

Planned_Qty5
Planned Quantity 5

—

Integer

Quantity of this brand planned to pack into tote 5
System Planner

Actual_Qty5
Actual Quantity 5

—

Integer

Quantity of this brand actually packed into tote 5
Robot Application

Case_Seq_Num6
Case Sequence Number 6

—

Integer

Indicates the sequence number of a case used to pack tote 6
System Planner

RSN_Number6
RSN Number 6

—

Character (6)

WSLCB record sequence number for the order
System Planner

Planned_Qty6
Planned Quantity 6

—

Integer

Quantity of this brand planned to pack into tote 6
System Planner

Actual_Qty6
Actual Quantity 6

—

Integer

Quantity of this brand actually packed into tote 6
Robot Application

Customers Table
This table is generated by the system planner and is used to store the
customer specific data for each unique customer in a day's run. The customer
table is also used to print packing lists for the totes.

align='left left center left left left left'
    scale ='.75' split=yes.
Customers Table
Table used to identify all the customers in a day's run. This
table is generated by the system planner.

Column Name
Full Name
Ind
Data Type
Value Set
Description
Data Origin

Outlet
Outlet Number
K
Character (6)

The outlet number for the order
System Planner

Bill_of_Lading
Bill of Lading
!
Character (9)

Bill of lading for the order
System Planner

Ship_Date
Ship Date
!,
Character (6)
YYMMDD
The ship date for this order
System Planner Total_Num_ Of_Totes
Total Number of Totes
!
Integer The total number of totes for this customer for this day's run
System Planner Completed_ Totes
Completed Totes
!
Integer The total number of totes completed for this customer for this day's run
Robot Application Side Side
!
Character (2)

The side of the building where totes are to be stacked when completed
Dbupdate process

What is claimed is:

1. A material handling system for distributing a plurality of items in accordance with a plurality of separate requests for specific quantities of said items, comprising:
   means for receiving said requests;
   means for receiving a plurality of said items, each item being provided in a predetermined quantity;
   means for automatically assembling said requested items in transport units contained within a work area of said material handling system for placement into said transport units in accordance with said requests, said requests including quantities of said items less than said predetermined quantity; and
   means for planning the distribution of said plurality of items by sequentially ordering said items to cause the predetermined quantity corresponding to the greatest number of requests for the item to be received in the work area first.

2. A system according to claim 1 wherein said planning means includes means for assigning specific quantities of said items to corresponding ones of said transport units.

3. A system according to claim 2 wherein said means for planning comprises:
   means for combining quantities for said items within at least two of said plurality of separate requests; and
   means for comparing the combined quantity for said item with said predetermined quantity of the item.

4. A system according to claim 3 wherein said means for planning further comprises:
   means for tracking the transport units, from oldest to newest, based on the length of time said transport units have been in the work area: and
   means for comparing the first sequential predetermined quantity of items with said assigned specific quantity for said item, corresponding to said oldest transport unit.

5. A system according to claim 4 wherein said means for planning further comprises means for instructing said means for assembling to place said first sequential predetermined quantity of items in said oldest transport unit when said predetermined quantity is less than or equal to said assigned specific quantity.

6. A system according to claim 5, wherein said means for planning further comprises:
   means for comparing the first sequential predetermined quantity of the items with the assigned specific quantity for said item corresponding to said oldest transport unit and successive transport units currently in the work area; and
   means for instructing said means for assembling to place said predetermined quantity of items in said oldest transport unit and said successive transport units when said predetermined quantity is less than or equal to said assigned specific quantity of said item for said oldest transport unit and said successive transport units.

7. A system according to claim 6, wherein said means for planning further comprises:

means for comparing the first sequential predetermined quantity of the item with the assigned specific quantity for said item corresponding to said oldest transport unit, said successive transport units and any other assigned specific quantity for said item corresponding to transport units not currently in the work area;
   means for determining if space is available for additional transport units in the work area;
   means for assigning additional transport units, corresponding to the other required quantity for the item, to the work area; and
   means for instructing said means for assembling to place said predetermined quantity of items in said oldest transport unit, said successive transport units and said additional transport units, when said predetermined quantity is less than or equal to said assigned specific quantity for said oldest transport unit, said successive transport units and said additional transport units.

8. A method for distributing a plurality of items, using a material handling system, in accordance with a plurality of separate requests for specific quantities of said items, comprising the steps of:
   receiving said requests by a processor within said material handling system;
   receiving a plurality of said items, each item being provided in a predetermined quantity;
   automatically assembling said requested items in transport units, contained within a work area of said material handling system for placement in said transport units in accordance with said requests, said requests including quantities of said items less than said predetermined quantity; and
   planning the distribution of said plurality of items by sequentially ordering said items to cause the predetermined quantity corresponding to the greatest number of requests for the item to be received in the work area first.

9. A method according to claim 8 wherein the step of planning includes the step of assigning specific quantities of said items to corresponding ones of said transport units.

10. A method according to claim 9 wherein said step of planning further comprises the steps of:
    combining quantities for said items within at least two of said plurality of separate requests; and
    comparing the combined quantity for said item with said predetermined quantity of the item.

11. A method according to claim 10 wherein said step of planning comprises:
    tracking the transport units, from oldest to newest, based on the length of time said transport units have been in the work area; and
    comparing the first sequential predetermined quantity of items with said assigned specific quantity for said item, corresponding to said oldest transport unit.

12. A method according to claim 11 wherein said step of planning further comprises the step of causing said first sequential predetermined quantity of items to be placed in said oldest transport unit when said predetermined quantity is less than or equal to said assigned specific quantity.

13. A method according to claim 12, wherein said step of planning further comprises the steps of:
comparing the first sequential predetermined quantity of the items with the assigned specific quantity for said item corresponding to said oldest transport unit and successive transport units currently in the work area; and
causing said predetermined quantity of items to be placed in said oldest transport unit and said successive transport units when said predetermined quantity is less than or equal to said assigned specific quantity of said item for said oldest transport unit and said successive transport units.

14. A method according to claim 13, wherein said step of planning further comprises the steps of:
comparing the first sequential predetermined quantity of the item with the assigned specific quantity for said item corresponding to said oldest transport unit, said successive transport units and any other assigned specific quantity for said item corresponding to transport units not currently in the work area;
determining if space is available for additional transport units in the work area;
assigning additional transport units, corresponding to the other required quantity for the item, to the work area; and
causing said predetermined quantity of items to be placed in said oldest transport unit, said successive transport units and said additional transport units, when said predetermined quantity is less than or equal to said assigned specific quantity for said oldest transport unit, said successive transport units and said additional transport units.

15. A method of distributing items, based on a plurality of separate requests for said items, comprising the steps of:
providing said items in a predetermined quantity;
controlling the distribution of said items to place quantities of said items, less than said predetermined quantity, in transport units, contained in a work area of a material handling system, each said transport unit being associated with one of said requests;
ordering a sequence of said items in predetermined quantities to cause the predetermined quantity corresponding to the greatest number of requests for the item therein to enter the work area first; and
automatically placing said items into said transport units.

16. A method according to claim 15 wherein said step of controlling comprises the steps of
combining quantities for said items within at least two of said plurality of separate requests; and
comparing the combined quantity for said item with said predetermined quantity of the item.

17. A method according to claim 16 further comprising the step of placing said items in said transport units, according to said combined requests, when said combined quantity is greater than or equal to said predetermined quantity.

18. A method according to claim 17 wherein said step of controlling comprises:
tracking the transport units, from oldest to newest, based on the length of time said transport units have been in the work area; and
comparing the first sequential predetermined quantity of items with the requirements for said item, corresponding to said oldest transport unit, any other successive transport units in the work area and any additional transport units, corresponding to said item, assignable to the work area.

19. A material handling system for distributing a plurality of items in accordance with a plurality of separate requests for specific quantities of said items, comprising:
means for receiving said requests;
means for receiving a plurality of said items, each item being provided in a predetermined quantity;
means for automatically assembling said requested items in transport units contained within a work area of said material handling system for placement into said transport units in accordance with said requests, said requests including quantities of said items less than said predetermined quantity;
means for planning the distribution of said plurality of items by sequentially ordering said items to cause the predetermined quantity corresponding to the greatest number of requests for the item to be received in the work area first, said means for planning including:
means for assigning specific quantities of said items to corresponding ones of said transport units:
means for combining quantities for said items within at least two of said plurality of separate requests;
means for comparing the combined quantity for said item with said predetermined quantity of the item;
means for tracking the transport units, from oldest to newest, based on the length of time said transport units have been in the work area; and
means for comparing the first sequential predetermined quantity of items with said assigned specific quantity for said item, corresponding to said oldest transport unit.

20. A system according to claim 19 wherein said means for planning further comprises means for instructing said means for assembling to place said first sequential predetermined quantity of items in said oldest transport unit when said predetermined quantity is less than or equal to said assigned specific quantity.

21. A system according to claim 20, wherein said means for planning further comprises:
means for comparing the first sequential predetermined quantity of the items with the assigned specific quantity for said item corresponding to said oldest transport unit and successive transport units currently in the work area; and
means for instructing said means for assembling to place said predetermined quantity of items in said oldest transport unit and said successive transport units when said predetermined quantity is less than or equal to said assigned specific quantity of said item for said oldest transport unit and said successive transport units.

22. A system according to claim 21, wherein said means for planning further comprises:
means for comparing the first sequential predetermined quantity of the item with the assigned specific quantity for said item corresponding to said oldest transport unit, said successive transport units and any other assigned specific quantity for said item corresponding to transport units not currently in the work area;

means for determining if space is available for additional transport units in the work area;

means for assigning additional transport units, corresponding to the other required quantity for the item, to the work area; and means for instructing said means for assembling to place said predetermined quantity of items in said oldest transport unit, said successive transport units and said additional transport units, when said predetermined quantity is less than or equal to said assigned specific quantity for said oldest transport unit, said successive transport units and said additional transport units.

23. A method for distributing a plurality of items, using a material handling system, in accordance with a plurality of separate requests for specific quantities of said items, comprising the steps of:

receiving said requests by a processor within said material handling system;

receiving a plurality of said items, each item being provided in a predetermined quantity;

automatically assembling said requested items in transport units, contained within a work area of said material handling system for placement in said transport units in accordance with said requests, said requests including quantities of said items less than said predetermined quantity; and planning the distribution of said plurality of items by sequentially ordering said items to cause the predetermined quantity corresponding to the greatest number of requests for the item to be received in the work area first, said step of planning including the steps of:

assigning specific quantities of said items to corresponding ones of said transport units;

combining quantities for said items within at least two of said plurality of separate requests;

comparing the combined quantity for said item with said predetermined quantity of the item;

tracking the transport units, from oldest to newest, based on the length of time said transport units have been in the work area; and comparing the first sequential predetermined quantity of items with said assigned specific quantity for said item, corresponding to said oldest transport unit.

24. A method according to claim 23 wherein said step of planning further comprises the step of causing said first sequential predetermined quantity of items to be placed in said oldest transport unit when said predetermined quantity is less than or equal to said assigned specific quantity.

25. A method according to claim 24, wherein said step of planning further comprises the steps of:

comparing the first sequential predetermined quantity of the items with the assigned specific quantity for said item corresponding to said oldest transport unit and successive transport units currently in the work area; and causing said predetermined quantity of items to be placed in said oldest transport unit and said successive transport units when said predetermined quantity is less than or equal to said assigned specific quantity of said item for said oldest transport unit and said successive transport units.

26. A method according to claim 25, wherein said step of planning further comprises the steps of:

comparing the first sequential predetermined quantity of the item with the assigned specific quantity for said item corresponding to said oldest transport unit, said successive transport units and any other assigned specific quantity for said item corresponding to transport units not currently in the work area;

determining if space is available for additional transport units in the work area;

assigning additional transport units, corresponding to the other required quantity for the item, to the work area; and causing said predetermined quantity of items to be placed in said oldest transport unit, said successive transport units and said additional transport units, when said predetermined quantity is less than or equal to said assigned specific quantity for said oldest transport unit, said successive transport units and said additional transport units.

27. A method of distributing items, based on a plurality of separate requests for said items, comprising the steps of:

providing said items in a predetermined quantity;

controlling the distribution of said items, by combining quantities for said items within at least two of said plurality of separate requests and comparing the combined quantity for said item with said predetermined quantity of the item to place quantities of said items, less than said predetermined quantity in transport units, contained in a work area of a material handling system, each said transport unit being associated with one of said requests, said step of controlling further including tracking the transport units, from oldest to newest, based on the length of time said transport units have been in the work area and comparing the first sequential predetermined quantity of items with the requirements for said item, corresponding to said oldest transport unit, any other successive transport units in the work area and any additional transport units, corresponding to said item, assignable to the work area;

ordering a sequence of said items in predetermined quantities to cause the predetermined quantity corresponding to the greatest number of requests for the item therein to enter the work area first; and automatically placing said items in said transport units, according to said combined requests, when said combined quantity is greater than or equal to said predetermined quantity.

* * * * *

UNITED STATES PATENT AND TRADEMARK OFFICE
CERTIFICATE OF CORRECTION

PATENT NO. : 5,363,310
DATED : November 8, 1994
INVENTOR(S) : Javad Haj-Ali-Ahmadi and Edward C. Hume III It is certified that error appears in the above-identified patent and that said Letters Patent is hereby corrected as shown below:

Col. 165, line 57, after "of" second occurrence, insert -- --.

Signed and Sealed this

Seventeenth Day of September, 1996

Attest:

BRUCE LEHMAN

Attesting Officer     Commissioner of Patents and Trademarks